United States Patent
Nanjyo et al.

(10) Patent No.: US 7,391,551 B2
(45) Date of Patent: Jun. 24, 2008

(54) METHOD FOR DRIVING LIGHT DEFLECTOR, LIGHT DEFLECTOR, LIGHT DEFLECTION ARRAY, IMAGE FORMING DEVICE, AND IMAGE PROJECTION DISPLAY APPARATUS

(75) Inventors: Takeshi Nanjyo, Miyagi (JP); Seiichi Katoh, Miyagi (JP); Kouichi Ohtaka, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 199 days.

(21) Appl. No.: 11/393,761

(22) Filed: Mar. 31, 2006

(65) Prior Publication Data
US 2006/0171015 A1 Aug. 3, 2006

Related U.S. Application Data

(63) Continuation of application No. 10/875,228, filed on Jun. 25, 2004, now Pat. No. 7,050,217.

(30) Foreign Application Priority Data
Jun. 27, 2003 (JP) ............... 2003-183969

(51) Int. Cl.
*G02B 26/00* (2006.01)
(52) U.S. Cl. ...................... 359/290; 359/291
(58) Field of Classification Search ................. 359/223, 359/224, 290, 291, 295, 298
See application file for complete search history.

(56) References Cited

U.S. PATENT DOCUMENTS

| 5,017,987 A | 5/1991 | Nanjoh et al. |
|---|---|---|
| 5,108,843 A | 4/1992 | Ohtaka et al. |
| 5,304,357 A | 4/1994 | Sato et al. |
| 5,408,113 A | 4/1995 | Kanno et al. |
| 5,448,113 A | 9/1995 | Suzuki et al. |
| 5,633,523 A | 5/1997 | Kato |
| 5,668,413 A | 9/1997 | Nanjo |
| 5,811,353 A | 9/1998 | Nanjo |
| 6,150,698 A | 11/2000 | Ohtsuka et al. |

(Continued)

FOREIGN PATENT DOCUMENTS

JP 6-138403 5/1994

(Continued)

OTHER PUBLICATIONS

K.E. Peterson, Applied Physics Letters, vol. 31, No. 8, pp. 521-523, "Micomechanical Light Modulator Array Fabricated on Silicon", Oct. 15, 1977.

(Continued)

*Primary Examiner*—Timothy J Thompson
(74) *Attorney, Agent, or Firm*—Oblon, Spivak, McClelland, Maier & Neustadt, P.C.

(57) ABSTRACT

A method for driving a light deflector the method includes turning over a direction of an electric field acting on the plate shape member, in an optional period. In the method, the light deflector deflects a beam incident on a light reflection area by displacing a plate shape member having the light reflection area with an electrostatic force. The light deflector includes a substrate, a plurality of control members, a fulcrum member, the plate shape member, and a plurality of electrodes.

15 Claims, 13 Drawing Sheets

U.S. PATENT DOCUMENTS

| | | |
|---|---|---|
| 6,312,108 B1 | 11/2001 | Kato |
| 6,324,149 B1 | 11/2001 | Mifune et al. |
| 6,332,669 B1 | 12/2001 | Kato et al. |
| 6,367,914 B1 | 4/2002 | Ohtaka et al. |
| 6,450,618 B2 | 9/2002 | Kato et al. |
| 6,467,881 B2 | 10/2002 | Katoh |
| 6,485,126 B1 | 11/2002 | Kato et al. |
| 6,636,368 B2 | 10/2003 | Ohtaka |
| 6,710,949 B2 | 3/2004 | Ohtaka |
| 6,900,915 B2 | 5/2005 | Nanjyo et al. |
| 2003/0142383 A1 | 7/2003 | Nanjyo et al. |
| 2004/0263945 A1* | 12/2004 | Nanjyo et al. ............... 359/291 |
| 2006/0171015 A1 | 8/2006 | Nanjyo et al. |

FOREIGN PATENT DOCUMENTS

| | | |
|---|---|---|
| JP | 7-214775 | 8/1995 |
| JP | 7-214776 | 8/1995 |
| JP | 7-214780 | 8/1995 |
| JP | 9-136413 | 5/1997 |
| JP | 2941952 | 6/1999 |
| JP | 3016871 | 12/1999 |
| JP | 2000-2842 | 1/2000 |
| JP | 2002-131838 | 5/2002 |
| WO | WO 96/41224 | 12/1996 |
| WO | WO 96/41226 | 12/1996 |

OTHER PUBLICATIONS

O. Solgaard, et al., Optics Letters, vol. 17, No. 9, pp. 688-690, "Deformable Grating Optical Modulator", May 1, 1992.

L.J. Hornbeck, SPIE, Critical Reviews Series, vol. 1150, pp. 86-102, "Deformale-Mirror Spatial Light Modulators", 1989.

P.F. Van Kessel, et al., Proceedings of the IEEE, vol. 86, No. 8, pp. 1687-1704, "A MEMS-Based Projection Display", Aug. 1998.

D.S. Dewald, Optical Engineering, vol. 39, No. 7, pp. 1802-1807, "Using Zemax Image Analysis and User-Defined Surfaces for Projection Lens Design and Evaluation for Digital Light Processing™ Projection Systems", Jul. 2000.

L.J. Horneck, et al., Introduces a System of the Projection Type Image Display Apparatus, vol. 68, No. 3, pp. 285-289, "Digital Micro Mirror Device Applied Physics", 1999.

U.S. Appl. No. 11/776,305, filed Jul. 11, 2007, Nanjyo et al.

U.S. Appl. No. 11/681,021, filed Mar. 1, 2007, Katoh et al.

* cited by examiner

METHOD FOR DRIVING LIGHT DEFLECTOR, LIGHT DEFLECTOR, LIGHT DEFLECTION ARRAY, IMAGE FORMING DEVICE, AND IMAGE PROJECTION DISPLAY APPARATUS

BACKGROUND OF THE INVENTION

1. Field of the Invention

The present invention generally relates to methods for driving light deflectors whereby the direction of outgoing light against incident light is changed. For example, the present invention can be used for image forming devices such as electrophotographic type printers or copiers, or projection type image display apparatuses such as projectors or digital theater systems.

2. Description of the Related Art

As an optical switch device using an electrostatic force, a device wherein a cantilever is deformed by an electrostatic force so that a reflection direction of light is changed (switched) and a light deflection system using the device were published by K. E. Petersen in 1977. See "Applied Physic Letters, Vol. 31, No. 8, page 521 to page 523", Japanese Patent No. 2941952, and Japanese Patent No. 3016871. In addition, D. M. Bloom et al. published an element wherein a diffraction grating is driven by an electrostatic force so that optical switching is performed. See "Optical Letters, Vol. 7, No. 9, page 688 to page 690".

Furthermore, Tibor et al. suggested a device wherein a digital micro mirror device is provided one-dimensionally or two-dimensionally, as an image device using a light deflection system. See Japanese Laid Open Patent Application No. 6-138403.

In addition, L. J. Hornbeck published a digital micro mirror device of a torsion beam type or a cantilever beam type as an element structure of the digital micro mirror device. See "Proc. SPIE Vol. 1150, page 86 to page 102, 1989". In the digital micro mirror device of the torsion beam type or the cantilever beam type which was published by L. J. Hornbeck, as well as the present invention, a mirror part is inclined. However, the digital micro mirror device of the torsion beam type or the cantilever beam type which was published by L. J. Hornbeck is different from the present invention in that the digital micro mirror device of the torsion beam type or the cantilever beam type which was published by L. J. Hornbeck has a structure wherein the mirror part has at least one or more fixed ends.

Furthermore, Gelbart Daniel suggested an element wherein both ends fixed type beam is deformed so as to have a cylindrical shape configuration and light deflection is performed at high speed. See Japanese Laid Open Patent Application No. 2000-2842.

L. J. Hornbeck et al. published a projection type image display apparatus, wherein a plurality of torsion beam type optical switch devices are provided two-dimensionally and optical signals corresponding to image information of respective pixels are led to a projection lens if necessary, so that the image is displayed, that is conventional art which is used for an actual product as an application of the optical switch device at present. See "A MEMS-Based Projection Display Proceedings Of The IEEE. Vol. 86, No. 8, August 1998, page 1687 to page 1704". According to "A MEMS-Based Projection Display Proceedings Of The IEEE. Vol. 86, No. 8, August 1998, page 1687 to page 1704", one light source is used and light outgoing from the light source passes a color wheel which rotates so as to convert in turn to lights of three color, red, green, and blue. After that, the light goes into one chip which is an arrayed optical switch device and is reflected if necessary. As a result of this, the optical signals corresponding to image information of respective colors, red, green, and blue, are led in order so that the image is displayed. By using the above-mentioned system, it is possible to display the image by only one light source and one chip. Hence, it is possible to manufacture the projection type image display apparatus at relatively low cost.

Furthermore, another system with regard to projection by the projection type image display apparatus using the above-mentioned optical switch device was introduced. See "Using ZEMAX Image Analysis and user-defined surfaces for projection lens design and evaluation for Digital Light Processing™ projection systems, Optical Engineering, Vol. 39 No. 7, July 2000, page 1802 to page 1807". More specifically, "Using ZEMAX Image Analysis and user-defined surfaces for projection lens design and evaluation for Digital Light Processing™ projection systems, Optical Engineering, Vol. 39 No. 7, July 2000, page 1802 to page 1807" introduced a technology whereby one light source is used and light outgoing from the light source passes through a TIR (Total Internal Reflection) PRISM. After that, the light passes through a COLOR PRISM which works for color separation and color composition so that color separation is performed and respective color lights enter into three chips. The lights are reflected in directions of objects if necessary. The lights pass through the COLOR PRISM again so as to be color-composed. The color composed light is led to the projection lens and thereby the image is displayed. By using the above-mentioned system, it is possible to display respective colors, red, green, and blue, simultaneously but not at low cost. Hence, it is possible to maximize the time for displaying respective colors at one frame and therefore it is possible to provide a projection type image display apparatus having high brightness.

The Japanese publication "Digital Micro Mirror Device Applied Physics Vol. 68, No. 3, 1999, page 285 to page 289" introduces a system of the projection type image display apparatus suggested by L. J. Hornbeck et al.

Japanese Laid Open Patent Application No. 2002-131838 introduces a projection apparatus as conventional art of the projection type image display apparatus using the optical switch wherein a diffraction grating is driven by an electrostatic force, published by D. M. Blooms. The projecting apparatus projects a light flux as an image on a screen by scanning by a scanning mirror. The light flux includes a vertical or horizontal line of image components formed by a color combining mechanism having a laser light source and a spatial modulator comprising a diffraction grating element, which modulates the phase, arranged in a one-dimensional line. However, since the laser light source is required from the perspective of the optical switch, the cost for manufacturing the projection type image forming device is made high.

The above-discussed optical switch using the cantilever beam or the cantilever type digital micro mirror device has weak points, that is, difficulty in ensuring stability of the beam and difficulty in making the response speed high. Furthermore, the torsion beam type digital micro mirror device also has a weak point in that mechanical strength of a hinge part (torsion beam) is degraded when used for a long period of time. In addition, the optical switch discussed in Japanese Patent 2941952 and Japanese Patent 3016871 has a weak point in that the wavelength of the incident light is limited. The element discussed in Japanese Laid Open Patent Application No. 2000-2842, namely an element whereby both ends fix beam is deformed in a cylindrical shape configuration by an electrostatic force at a space between electrodes, has an advantage in that it is possible to deform at high speed so that the response speed can be made high. However, in this element, since both ends are fixed, it is not possible to make the driving voltage as low as the device of the cantilever beam type or torsion beam type.

The above-discussed conventional art optical switches are shown in FIG. 1. More specifically, a torsion type is shown in FIG. 1-(a), a cantilever type is shown in FIG. 1-(b), and a both ends fixed beam type is shown in FIG. 1-(c). The above-mentioned optical switches include two or three electrodes. In the optical switches, different electric potentials are applied between electrodes facing each other at a plane surface so that an electrostatic force is applied. As a result of this, the mirror surface is changed and therefore light deflection is performed. On the other hand, in the light deflection device of the present invention, a plurality of electrodes such as four electrodes, are formed at a same plane surface and a plate member having a conductive layer which electrically floats is formed so as to face the electrodes. The plate member which electrically floats has optional electric potential by the application of different electric potentials between neighboring electrodes, so that an electrostatic force acts on the plate member. The plate member having a mirror surface is inclined and deformed against a fulcrum member as a center so that the light deflection operation is implemented.

There is a problem regarding an electrical charge stored at an insulating film between electrodes due to high driving voltage, which is a problem common to devices (hereinafter, "electrostatic device") driven by an electrostatic force including the light deflection device of the present invention. Due to this electrical charge storage problem, the insulating film, formed so as to prevent the electrodes facing each other from shorting, stores electrical charges at a localized level in the vicinity of electrode interfaces in an electrical field of several mV/cm, and therefore it appears that the insulating film has electric potential. As a result of this, electrostatic attraction between the electrodes is reduced, the deformation is reduced, and stored electrical charge stays behind so that the deformation is generated even though the electric potential is provided between the electrodes. This causes an incorrect action of the light deflection device, for example.

For the above-discussed problems, there is a method to improve the electrical charge storage at the electrostatic device formed by two electrodes facing each other at the plane surface. See Japanese Laid Open Patent Application No. 7-214775, Japanese Laid Open Patent Application No. 7-214776, Japanese Laid Open Patent Application No. 7-214780, and Japanese Laid Open Patent Application No. 9-136413. In electrostatic actuating type printing apparatuses described in the Japanese Laid Open Patent Application No. 7-214775, Japanese Laid Open Patent Application No. 7-214776, Japanese Laid Open Patent Application No. 7-214780, and Japanese Laid Open Patent Application No. 9-136413, a vibration plate which is a common electrode is grounded. Also, an electric potential is applied to individual electrodes by mutually changing polarity in timing with ink discharge. In addition, a reversed polarity electric potential is applied to the individual electrodes at the time when the printing apparatus starts working so as to remove electrical charge stored at the insulating film.

However, the above-discussed driving method for controlling the electrical charge storage cannot be applied to a structure where the plate member which electrically floats is deformed due to an electrostatic attraction generated from an electrical field based on a difference of electric potentials applied to the plurality of electrodes formed at the same plane surface.

SUMMARY OF THE INVENTION

Accordingly, it is a general object of the present invention to provide a novel and useful method for driving light deflector, light deflector, light deflection array, image forming device, and image projection display apparatus, in which one or more of the problems described above are eliminated.

More specifically, the object of the present invention is to provide a light deflector whereby it is easy to stably control a deflection angle of a mirror, response speed is high, there is little degradation for a long period of time, it is possible to drive at a lower voltage, it is possible to improve the ratio of on/off of the reflection light (S/N ratio in an image device or a contrast ratio in a picture device), it is possible to achieve miniaturization and integration at a low cost, and it is possible to do two-dimensional light deflection in one axial direction or three-dimensional light deflection in two axial directions. It is another object of the present invention to provide a method for driving the light deflector whereby an error operation due to storage of electrical charge can be controlled.

The above object of the present invention is achieved by a method for driving a light deflector, wherein the light deflector deflects a beam incident on a light reflection area by displacing a plate shape member having the light reflection area with an electrostatic force, wherein the light deflector includes a substrate, a plurality of control members, a fulcrum member, the plate shape member, and a plurality of electrodes, wherein stoppers are provided at upper parts of the control members and the control members are provided at a plurality of end parts of the substrate, wherein the fulcrum member includes a vertex part and is provided at an upper surface of the substrate, wherein the plate shape member does not have a fixed end, the light reflection area is provided at an upper surface thereof, the plate shape member includes a conductive layer made of a member partially having conductivity, the plate shape member is movably arranged in a space formed by the substrate, the fulcrum member, and the stoppers, and wherein the electrodes are provided on the substrate and substantially face toward the conductive layer of the plate shape member, the method including:

turning over a direction of an electric field acting on the plate shape member, in an optional period.

According to the above mentioned invention, since an electric field having an opposite direction acts on an insulating film of the electrode corresponding to a period, a stored electrical charge is set off and removed. As a result of this, a light deflection operation of the light deflector can be stable.

In the method, neighboring two of the electrodes are provided at one side (ON side) and another neighboring two of the electrodes may be provided at another side (OFF side) under the state in which the fulcrum member is a center, the method may further includes the steps of:

a) applying different electric potentials to the electrodes provided at the OFF side and applying an intermediate electric potentials of the different electric potentials to the electrodes provided at the ON side;

b) applying the intermediate electric potential to the electrodes provided at the OFF side and applying the different electric potentials to the electrodes provided at the ON side;

c) applying switched different electric potentials to the electrodes provided at the OFF side and applying the intermediate electric potential of the different electric potentials to the electrodes provided at the ON side; and d) applying the intermediate electric potential to the electrodes provided at the OFF side and applying the switched different electric potentials to the electrodes provided at the ON side.

According to the above mentioned invention, since, an electric potential of the plate shape member becomes the intermediate electric potential in step 1, step 2, step 3 and step 4, respectively so that the electric field is generated between the electrode where different electric potential is applied and the plate shape member. Furthermore, the direction of the electric field in step 1 is opposite to the direction of the electric field in step 3. Also, the direction of the electric field in step 2 is opposite to the direction of the electric field in step 4. Therefore, since an electric field having an opposite direction is acts on an insulating film of the electrode corresponding to the step, stored electrical charge is set off and removed. As a result of this, a light deflection operation of the light deflector can be stable.

In the method, one of the different electric potentials may be a positive electric potential, the other of the different electric potentials may be made ground, and the intermediate electric potential may have a value of a half of the positive electric potential.

In a case where the driving circuit is formed at the same substrate as the light deflector, the polarity of an electric potential applied to four electrodes of the light deflector is formed by a single-polar. Therefore, a single-polar driving circuit of has a simpler structure than a bipolar driving circuit, so that it is possible to reduce the manufacturing cost of the light deflector.

One of the different electric potentials may be a positive electric potential, the other of the different electric potentials may be a negative electric potential, and the intermediate electric potential may be made ground.

According to the invention, the electric potential of the electrically floating plate shape member becomes substantially the same as ground being the intermediate electric potential. Hence, it is difficult to generate the electric field between the plate shape member and the control member that is the stopper. Therefore, it is possible to prevent the insulating film which forms the control member at the time when the plate shape member collides with the stopper from being electrically charged. That is, since storage of the electrical charge at the control member can be controlled, an optional tilt and displacement corresponding to the electric potential of the electrode of the plate shape member becomes stable so that the light deflection operation of the light deflector can be further stable.

Each of the steps a) through d) may correspond to a light deflection operation.

Compared with a case where respective steps are repeated within one time light of deflection operation, it is not necessary to switch the steps at a high speed. Hence, since driving frequency of the driving circuit to which the electric potential is applied can be reduced, a cheap driving circuit can be used and a cheap light deflector can be provided.

The step a) and step c) may bee repeated in a same light deflection operation, and the step b) and step d) may be repeated in another same light deflection operation.

According to the above-mentioned invention, even if the different electric potential is a high electric potential and an amount of stored electric charge is large, since the stored electric charge is removed in one time of light deflection, it is possible to prevent the light deflector for operating unstably. That is, it is possible to stably operate the light deflector at a high driving voltage.

The above object of the present invention is achieved by a light deflector which deflects a beam incident on a light reflection area by displacing a plate shape member having the light reflection area with an electrostatic force, including:
a substrate;
a plurality of control members;
a fulcrum member;
the plate shape member; and
a plurality of electrodes;
wherein stoppers are provided at upper parts of the control members and the control members are provided at a plurality of end parts of the substrate,
wherein the fulcrum member includes a vertex part and is provided at an upper surface of the substrate,
wherein the plate shape member does not have a fixed end, the light reflection area is provided at an upper surface thereof, the plate shape member includes a conductive layer made of a member partially having conductivity, the plate shape member is movably arranged in a space formed by the substrate, the fulcrum member, and the stoppers, and
wherein the electrodes are provided on the substrate and substantially face toward the conductive layer of the plate shape member, and
wherein a direction of an electric field acting on the plate shape member is turned over in an optional period so that a light deflection operation is implemented.

According to the above-mentioned invention, it is possible to provide a light deflector which can be stably operated without poor operation due to repeated driving.

The above object of the present invention is achieved by a light deflection array, including:
a plurality of light deflectors which are provided one-dimensionally or two-dimensionally and which deflect a beam incident on a light reflection area by displacing a plate shape member having the light reflection area with an electrostatic force,
wherein each of the light deflectors includes a substrate, a plurality of control members, a fulcrum member, and the plate shape member, and a plurality of electrodes,
wherein stoppers are provided at upper parts of the control members and the control members are provided at a plurality of end parts of the substrate,
wherein the fulcrum member includes a vertex part and is provided at an upper surface of the substrate,
wherein the plate shape member does not have a fixed end, the light reflection area is provided at an upper surface thereof, the plate shape member includes a conductive layer made of a member partially having conductivity, the plate shape member is movably arranged in a space formed by the substrate, the fulcrum member, and the stoppers,
wherein the electrodes are provided on the substrate and substantially face toward the conductive layer of the plate shape member, and
wherein a direction of an electric field acting on the plate shape member is turned over in an optional period so that a light deflection operation is implemented.

Since the light deflector is operated stably at the time of repeated operation, it is possible to provide a light deflector which can be stably operated without poor operation due to repeated driving.

The above object of the present invention is achieved by an image forming device, including:
a light deflection array used as a light writing unit;
wherein the light deflection array includes a plurality of light deflectors which are provided one-dimensionally or two-dimensionally and which deflect a beam incident on a light reflection area by displacing a plate shape member having the light reflection area with an electrostatic force, wherein each of the light deflectors includes a substrate, a plurality of control members, a fulcrum member, and the plate shape member, and a plurality of electrodes, wherein stoppers are provided at upper parts of the control members and the control members are provided at a plurality of end parts of the substrate, wherein the fulcrum member includes a vertex part and is provided at an upper surface of the substrate, wherein the plate shape member does not have a fixed end, the light reflection area is provided at an upper surface thereof, the plate shape member includes a conductive layer made of a member partially having conductivity, the plate shape member is movably arranged in a space formed by the substrate, the fulcrum member, and the stoppers, wherein the electrodes are provided on the substrate and substantially face toward the conductive layer of the plate shape member, and wherein a direction of an electric field acting on the plate shape member is turned over in an optional period so that a light deflection operation is implemented.

According to the above mentioned invention, it is possible to stably operate respective light deflectors, which form the light deflection array, at the time of repeating operations by using the light deflection array as a light writing unit of the image forming device. Therefore, light writing corresponding to an image signal is implemented to respective printing dots without error operations so that a desirable image can be formed precisely.

The above object of the present invention is achieved by an image projection display device, including:

a light deflection array used as a display unit;

wherein the light deflection array, includes a plurality of light deflectors which are provided one-dimensionally or two-dimensionally and which deflect beam incident on a light reflection area by displacing a plate shape member having the light reflection area with an electrostatic force, wherein each of the light deflectors includes a substrate, a plurality of control members, a fulcrum member, and the plate shape member, and a plurality of electrodes, wherein stoppers are provided at upper parts of the control members and the control members are provided at a plurality of end parts of the substrate, wherein the fulcrum member includes a vertex part and is provided at an upper surface of the substrate, wherein the plate shape member does not have a fixed end, the light reflection area is provided at an upper surface thereof, the plate shape member includes a conductive layer made of a member partially having conductivity, the plate shape member is movably arranged in a space formed by the substrate, the fulcrum member, and the stoppers, wherein the electrodes are provided on the substrate and substantially face toward the conductive layer of the plate shape member, and wherein a direction of an electric field acting on the plate shape member is turned over in an optional period so that a light deflection operation is implemented.

According to the above mentioned invention, It is possible to stably operate respective light deflectors, which form the light deflection array, at the time of repeating operations by using the light deflection array as a light writing unit of the image forming device. Therefore, display operation of the light information corresponding to an image signal is implemented to respective pixels without error operation so that a desirable image can be formed precisely.

Other objects, features, and advantages of the present invention will become more apparent from the following detailed description when read in conjunction with the accompanying drawings.

DETAILED DESCRIPTION OF THE PREFERED EMBODIMENTS

A description will now be given, with reference to drawings of embodiments of the present invention.

Figure 4:
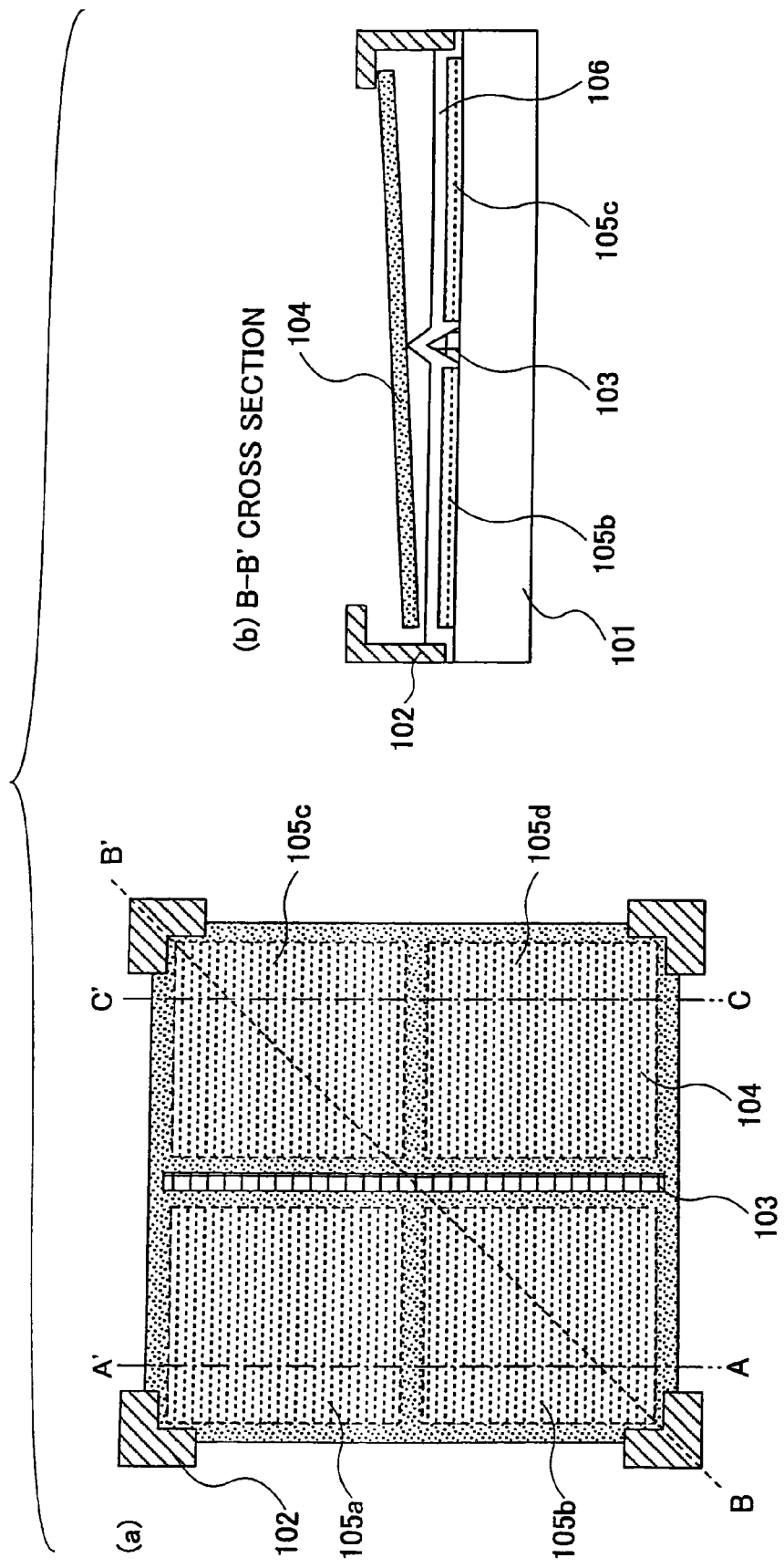
FIG. 4 is a view showing a structure of a light deflector of the present invention.

FIG. 4 is a view showing a structure of the light deflector of the present invention. More specifically, FIG. 4-(a) is a plan view of the light deflector (a fulcrum member 103 and electrodes 105a, 105b, 105c, and 105d are drawn as though permeating the light deflector). FIG. 4-(b) is a cross-sectional view of the light deflector taken along the plane B-B' of FIG. 4-(a).

The light deflector of the present invention includes a substrate 101, a plurality of control members 102, a fulcrum member 103, a plate shape member 104, and a plurality of electrodes 105. Stoppers are provided at upper parts of the control members 102 which are respectively provided at a plurality of end parts of the substrate 101. The fulcrum member 103 having a vertex part is provided at an upper surface of the substrate 101. The plate shape member 104 does not have a fixed end. A light reflection area is provided at an upper surface of the plate shape member 104. The plate shape member 104 includes a conductive layer made of a member partially having conductivity. The plate shape member 104 is movably arranged in a space formed by the substrate 101, the fulcrum member 103, and the stoppers. The electrodes 105 are respectively provided on the substrate 101 and substantially face toward the conductive layer of the plate shape member 104.

The substrate 101 is any substrate. It is preferable that the substrate 101 be one generally used for a semiconductor process or liquid crystal process, such as silicon or glass, from the perspective of micro processing. In addition, it is preferable that the substrate 101 be a silicon substrate having a (100) surface direction, under the consideration of a driving circuit being formed at the same substrate so as to reduce the cost.

The control members 102 have the stoppers which are one of the special features of the light deflector of the present invention. The stoppers are provided at the upper part of the control members 102. A plurality of the control members 102 are provided so as to form a woven hat shape configuration, so that the movable range of the plate shape member 104 is limited to an optional space. It is preferable that the control members 102 be formed by a space-saving structure and by a thin film so as to maximize the area ratio of a reflection area at the time of making arrays and for the control member 102 to have high mechanical strength. Furthermore, a permeable silicon oxide film or a permeable chrome oxide film is selected for the control member 102 as corresponding to an ability required for the light deflector.

The fulcrum member 103 functions as a fulcrum when the plate shape member 104 is displaced. The fulcrum member 103 has a ridge-shaped configuration which comes in contact with the plate shape member 104 in a line. Depending on the structure of the light deflector, the fulcrum member 103 may have a cone-shaped configuration which comes in contact with the plate shape member 104 in a point. Because of the above-discussed structure of the fulcrum member 103, it is possible to increase the mechanical strength at a side of the substrate 101 of the fulcrum member 103. In addition, the plate shape member 104 does not make contact with an inclined plane of the fulcrum member 103 and the displacement of the plate shape member 104 is defined by a contact part, attached to the upper surface of the substrate 101, making contact at an end part of the plate shape member 104. Hence, it is possible to relatively reduce an anchorage or a contact electrical charge of the plate shape member 104 to the substrate 101 by reducing the contact area as much as possible. Furthermore, since an area where the fulcrum member 103 comes in contact with the plate shape member 104 is a line, an inclination displacement angle and direction of the plate shape member 104 are defined by making contact with the fulcrum member 103 or the substrate 101.

In a case where the fulcrum member 103 comes in contact with the plate shape member 104 in a point, namely the fulcrum member 103 has a cone-shaped configuration, it is possible to incline and displace the plate shape member 104 in any direction corresponding to a direction of an electrostatic attraction and thereby a light deflection in one axial direction or two axial directions can be done. Under consideration of the mechanical strength, a silicon oxide film or a silicon nitride film is preferable as a material of the fulcrum member 103. When the electric potential of the plate shape member 104 is received via the fulcrum member 103, a conductive material such as various kinds of metal film is used as a material for the fulcrum member 103.

The plate shape member 104 is a plane plate at least in the light reflection area. A metal having good reflectivity such as aluminum and an aluminum alloy, titanium and a titanium alloy, and a single layer or stacked layers thereof, is used as the material of the plate shape member 104. Since the metal film has high conductivity, the displacement of the plate shape member 104 is achieved at even a low voltage.

Furthermore, the plate shape member 104 is not limited to having a single layer structure but may have a stacked later structure with an insulating layer, for example. As the insulating layer, a silicon oxide film or a silicon nitride film may be used. By making the stacked layer structure with the insulating layer, it is possible to improve the dielectric voltage with the electrodes so as to heighten reliability.

The electrodes 105a-105d are formed on the substrate 101. An electrical field is generated with the plate shape member 104 which electrically floats by applying different electric potentials to the electrodes 105a-105b. As a result of this, an electrostatic attraction is generated so that the plate shape member 104 is tilted and displaced in an optional direction and therefore light deflection is performed.

The electrodes 105a-105d are made of a metal film such as a titanium nitride film, a chrome film, an aluminum film, or an alloy film of the above mentioned metals. The electrodes 105a-105d may be made by pouring boron, arsenic, or phosphorus into a silicon substrate so as to have a low resistance. An insulating film 106 is formed on the electrodes 105 in order to maintain insulation from the plate shape member 104. Furthermore, the electrodes 105a-105d may have structures where the insulating layers are formed at a side of the plate shape member 104 without the insulating layer 106.

As discussed above, the object of the present invention is to reduce the storage of the electrical charge in the insulating layer 106. Under consideration of the adjustment with the semiconductor process, it is preferable that the insulating layer 106 be a silicon oxide film or a silicon nitride film. However, the present invention is not limited to this.

The light deflector of the present invention having the above discussed structure has the following special features.

First, since the inclination angle of the plate shape member 104 is determined by contact with the fulcrum member 103, the substrate 101, and the plate shape member 104, it is possible to easily and stably control a deflection angle of the mirror.

Second, since the plate shape member 104 which is thin film, turns over at high speed by the application of different voltages to the electrodes 105 facing each other around the fulcrum member 103, response speed can be made high.

Third, since the plate shape member 104 does not have a fixed end, the plate shape member 104 does not involve a deformation such as a torsion deformation. Hence, long-term degradation is small and driving at a low voltage can be done.

Fourth, since the minute plate shape member 104 having a light weight can be formed by a semiconductor process, impact due to collision with the stoppers is minimum and therefore long-term degradation is small.

Fifth, the ratio of on/off of the reflection light (S/N ratio in an image device or a contrast ratio in a picture device) can be improved by optionally determining a structure of the control member, the plate shape member and the light reflection area.

Sixth, since a semiconductor process and device can be used, it is possible to achieve micro-making (miniaturization) and integration at a low cost.

Seventh, light deflection in one axial direction or two axial directions can be done by arranging a plurality of the electrodes 105 around the fulcrum member.

Figure 1:
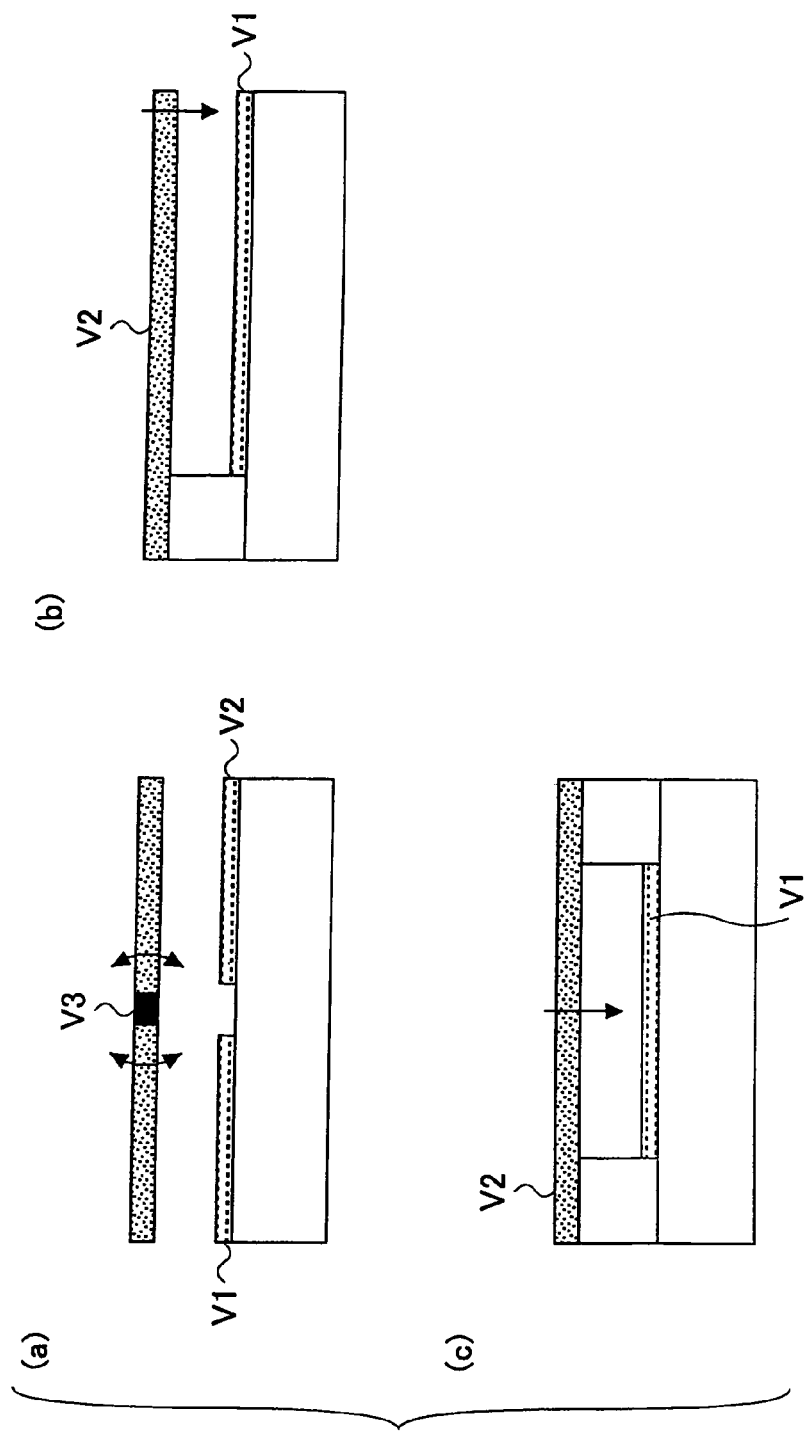
FIG. 1 is a cross-sectional view of a conventional art optical switch.
Figure 2:
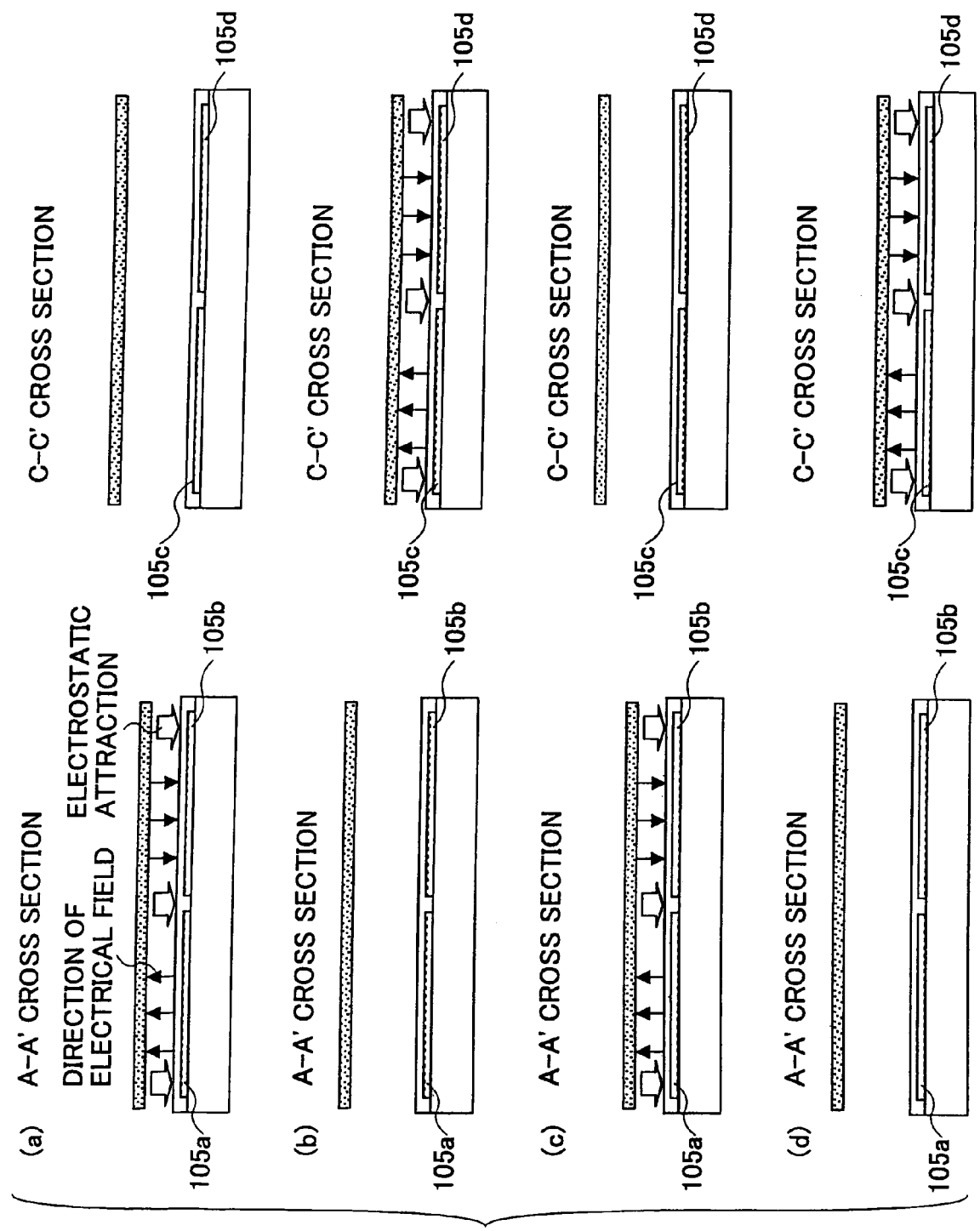
FIG. 2 is a cross-sectional view showing a conventional method for driving a light deflector.

Next, a conventional method (conventional example 1) for driving by using the light deflector of the present invention shown in FIG. 4 as an example, is explained. FIG. 2-(a) through FIG. 2-(d) are cross-sectional views of the light deflector taken along the planes A-A' and C-C' of FIG. 4-(a) at the time of light deflection operations.

In the conventional example 1, switching electric potentials applied to the electrodes 105a-105d corresponds to the light deflection operations. FIG. 2-(a) corresponds to step 1. FIG. 2-(b) corresponds to step 2. FIG. 2-(c) corresponds to step 3. FIG. 2-(d) corresponds to step 4.

Directions of electrical fields generated by electric potentials applied to the electrodes 105a-105d are shown by black arrows and electrostatic attractions shown by white arrows in FIG. 2-(a), FIG. 2-(b), FIG. 2-(c), and FIG. 2-(d).

Figure 3:
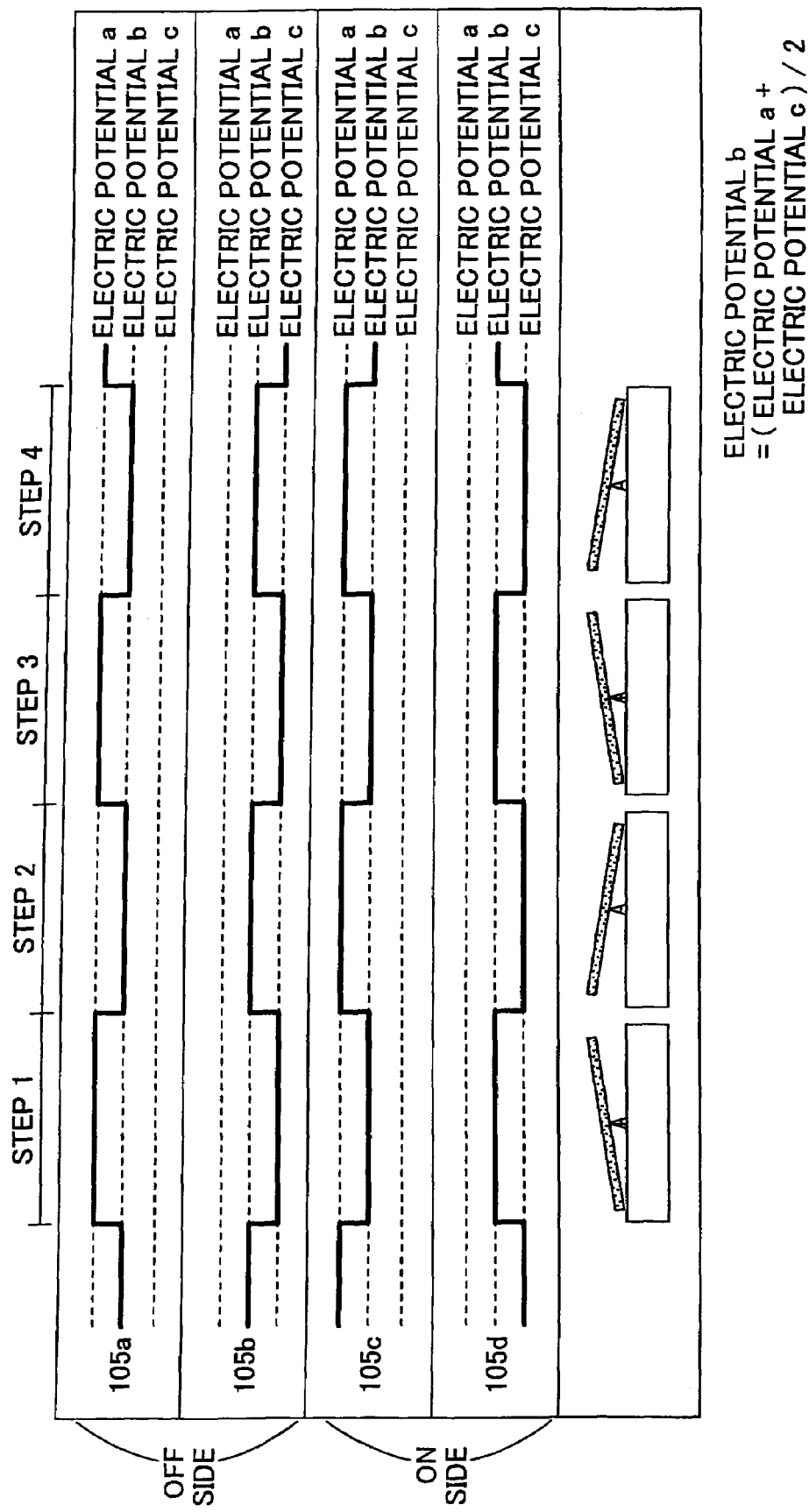
FIG. 3 is a timing chart of electric potentials applied to electrodes in the conventional method for driving the light deflector.

FIG. 3 is a timing chart of electric potentials applied to electrodes in the conventional method for driving the light deflector of the conventional example 1. In FIG. 3, the electric potential "a" is different from the electric potential "c". The intermediate electric potential is electric potential "b". In FIG. 3, the light deflection operation at each step is shown.

Referring to FIG. 2 and FIG. 3, a conventional method for driving light deflector and an inclination displacement operation (light deflection operation) of the plate shape member 104 corresponding to this are described.

In the step 1, a high electric potential "a" is applied to the electrode 105a, a low electric potential "c" is applied to the electrode 105b, and an intermediate electric potential "b" is applied to the electrodes 105c and 105d. As a result of this, the plate shape member 104 having the conductive layer and facing electrodes 105, which electrically floats, becomes the same potential as the intermediate electric potential b, as is easily assumed from a simple calculation of a closed circuit.

As a result of this, an electrical field is not generated to the electrodes 105c and 105d at a side of "ON". An electrical field is generated to the electrodes 105a and 105b at a side of "OFF" as shown in FIG. 2-(a). A distribution of this electrical field is characteristic of the light deflector of the present invention and extremely different from the method for driving the optical switch formed by two or three electrodes. Because of the electrical field, electrostatic attractions are generated between the electrode 105a and the plate shape member 104 and between the electrode 105b and the plate shape member 104, so that the plate shape member 104 is tilted and displaced to the side of OFF. This operation may be a reset operation implemented at an early stage of a series of light deflections or OFF operations of the series of light deflections.

Next, in the step 2, a high electric potential "a" is applied to the electrode 105c, a low electric potential "c" is applied to the electrode 105d, and an intermediate electric potential "b" is applied to the electrodes 105a and 105b. As a result of this, the plate shape member 104 having the conductive layer and facing electrodes 105, which electrically floats, becomes the same potential as the intermediate electric potential b, as is easily assumed from a simple calculation of a closed circuit.

As a result of this, an electrical field is not generated to the electrodes 105a and 105b at a side of "OFF". An electrical field is generated to the electrodes 105c and 105d at a side of "ON" as shown in FIG. 2-(b). Because of the electrical field, electrostatic attractions are generated between the electrode 105c and the plate shape member 104 and between the electrode 105d and the plate shape member 104, so that the plate shape member 104 is tilted and displaced to the side of ON. This operation is an ON operation of the series of light deflections.

Next, in the step 3, as in the step 1, a high electric potential "a" is applied to the electrode 105a, a low electric potential "c" is applied to the electrode 105b, and an intermediate electric potential "b" is applied to the electrodes 105c and 105d. As a result of this, the plate shape member 104 having the conductive layer and facing electrodes 105, which electrically floats, becomes the same potential as the intermediate electric potential b. As a result of this, an electrical field is not generated to the electrodes 105c and 105d at a side of "ON". An electrical field is generated to the electrodes 105a and 105b at a side of "OFF" as shown in FIG. 2-(c).

At this time, in the conventional example 1, the direction of the electrical field is the same as the direction shown in FIG. 2-(a). Because of the electrical field, electrostatic attractions are generated between the electrode 105a and the plate shape member 104 and between the electrode 105b and the plate shape member 104, so that the plate shape member 104 is tilted and displaced to the side of OFF. This operation is the OFF operation of the series of light deflections.

Next, in the step 4, a high electric potential "a" is applied to the electrode 105c, a low electric potential "c" is applied to the electrode 105d, and an intermediate electric potential "b" is applied to the electrodes 105a and 105b. As a result of this, the plate shape member 104 having the conductive layer and facing electrodes 105, which electrically floats, becomes the same potential as the intermediate electric potential b. As a result of this, an electrical field is not generated to the electrodes 105a and 105b at a side of "ON". An electrical field is generated to the electrodes 105c and 105d at a side of "OFF" as shown in FIG. 2-(d).

At this time, in the conventional example 1, the direction of the electrical field is the same as the direction shown in FIG. 2-(b). Because of the electrical field, electrostatic attractions are generated between the electrode 105c and the plate shape member 104 and between the electrode 105d and the plate shape member 104, so that the plate shape member 104 is tilted and displaced to the side of ON.

Thus, in the method for driving in the conventional example 1, the electrical fields having the same directions are generated to the insulating films of the respective electrodes for every light deflection. In the light deflector of the present invention, the storage of the electrical charge into the insulating film is less than in the conventional optical switch because there is little contact between the insulating film and the plate shape member. However, generation of the electrical field in the same directions in the insulating film corresponding to the light deflection operations causes the storage of the electrical charge via a few of the points of contacts. Due the storage of the electrical charge, the light deflector may be operated in error. More specifically, the error operation may be a big problem when the voltage for driving is made high in order to improve ability.

First Embodiment

Figure 5:
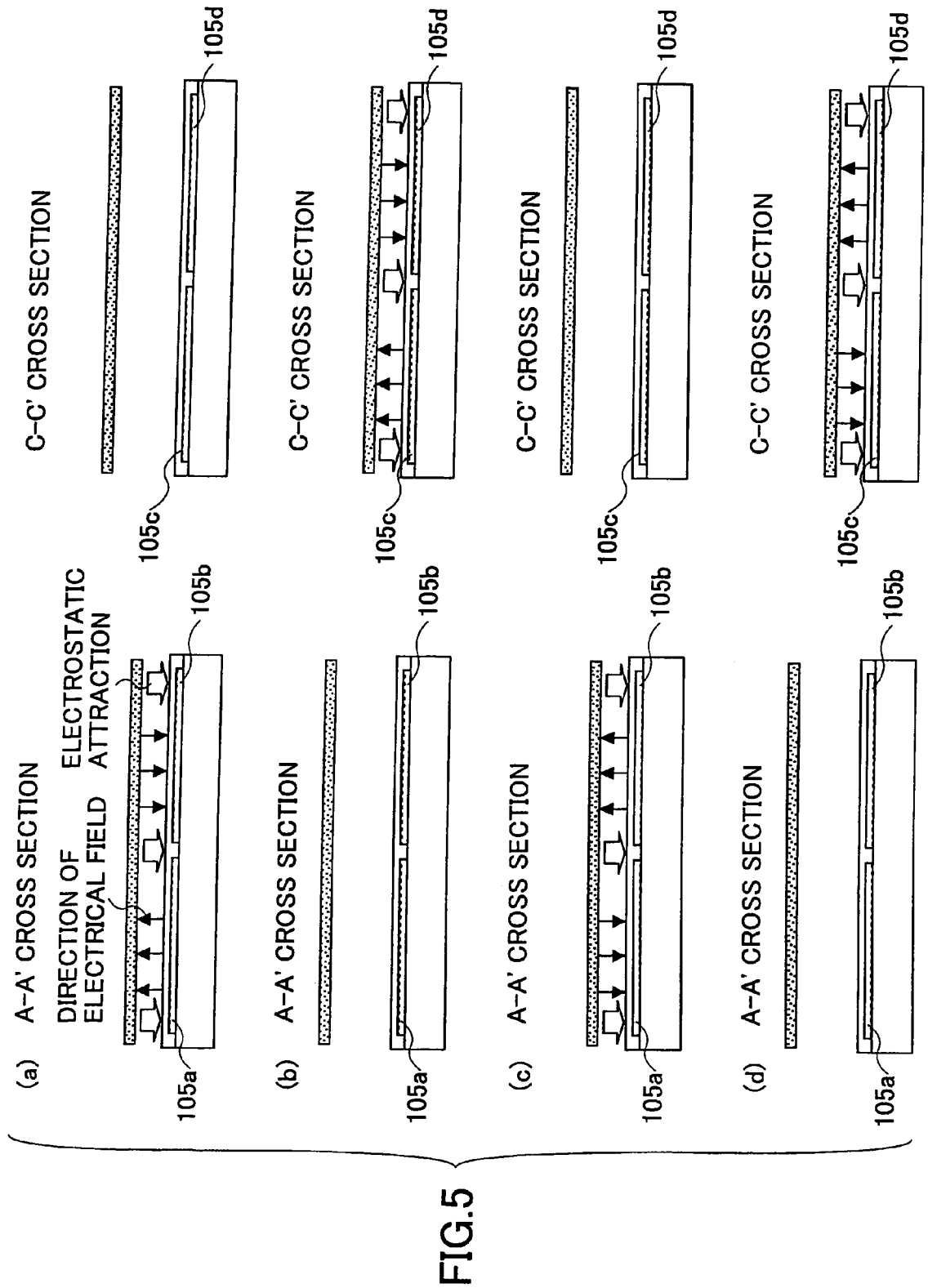
FIG. 5 is a cross-sectional view showing a method for driving a light deflector of the first embodiment of the present invention.

FIG. 5 is a cross-sectional view showing a method for driving a light deflector of the first embodiment of the present invention. The first embodiment is an example wherein the light deflector of the present invention shown in FIG. 4 is stably light-deflection-operated. FIG. 5-(a) through FIG. 5-(d) are cross-sectional views of the light deflector taken along the planes A-A' and C-C' at the time of light deflection operations. FIG. 5-(a) corresponds to step 1. FIG. 5-(b) corresponds to step 2. FIG. 5-(c) corresponds to step 3. FIG. 5-(d) corresponds to step 4.

Directions of electrical fields generated by electric potentials applied to the electrodes 105a-105d are shown by black arrows and electrostatic attractions shown by white arrows in FIG. 5-(a), FIG. 5-(b), FIG. 5-(c), and FIG. 5-(d).

Figure 6:
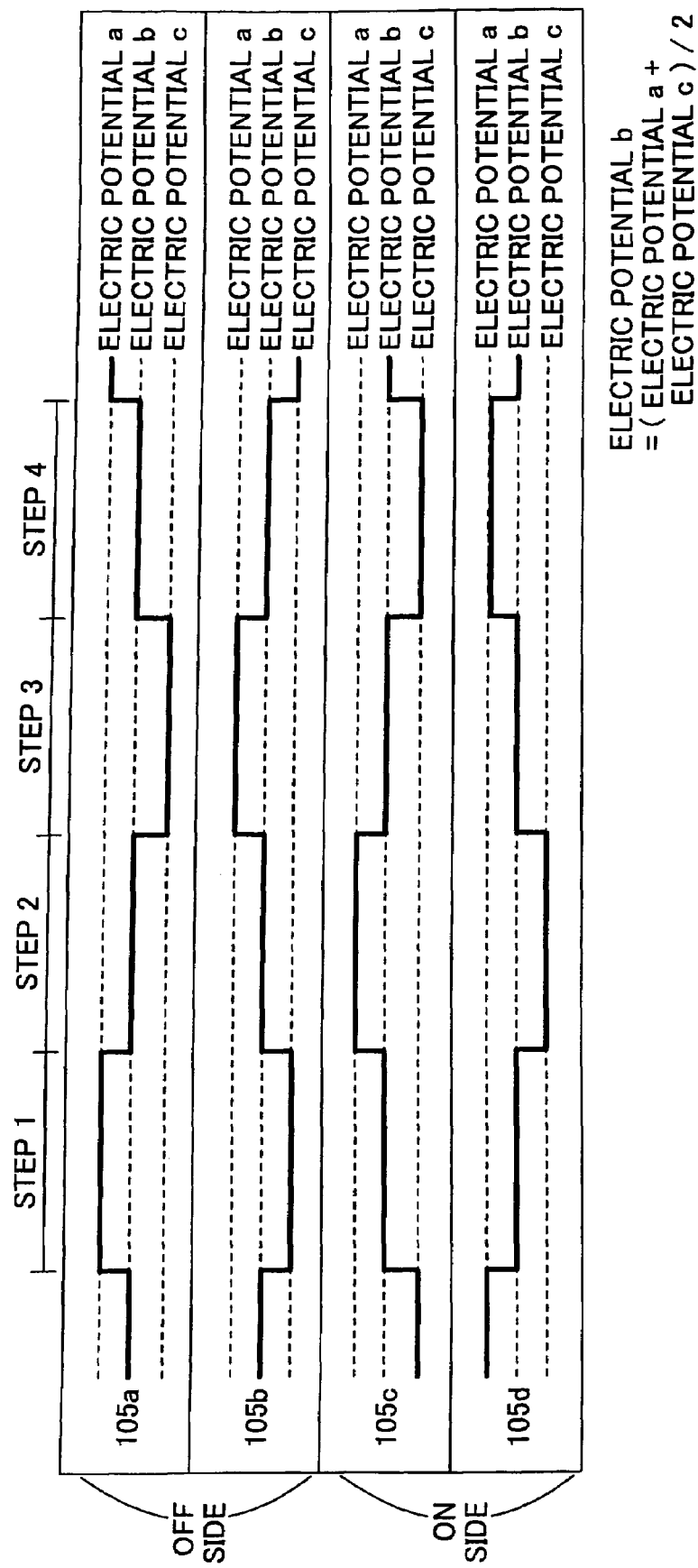
FIG. 6 is a timing chart of electric potentials applied to electrodes in the method for driving the light deflector of the first embodiment.

FIG. 6 is a timing chart of electric potentials applied to electrodes in the method for driving the light deflector of the first embodiment. In FIG. 6, the electric potential "a" is different from the electric potential "c". The intermediate electric potential is electric potential "b". Referring to FIG. 5 and FIG. 6, the method for driving the light deflector of the present invention and tilt displacement operations (light deflection operations) of the plate shape member 104 corresponding to the method are discussed.

In the method for driving the light deflector of the first embodiment, the direction of the electrical field applied to the plate shape member 104 is turned over (reversed) in an optional period. That is, in the method for driving the light deflector of the first embodiment, two electrodes 105 are provided at one side and two other electrodes 105 are provided at the other side under the state wherein the fulcrum member 103 is a center. In the step 1, different electric potentials are applied to neighboring two electrodes 105a and 105b situated at one side (OFF side) and the intermediate electric potential of the different electric potential is applied to neighboring two electrodes 105c and 105d situated at the other side (ON side). In the step 2, the intermediate electric potential is applied to neighboring two electrodes 105a and 105b situated at one side (OFF side) and the different electric potentials are applied to neighboring two electrodes 105c and 105d situated at the other side (ON side). In the step 3, electric potentials switched and different from the electric potentials in the first step are applied to the neighboring two electrodes 105a and 105b situated at one side (OFF side) and the intermediate electric potential of the different electric potentials is applied to neighboring two electrodes 105c and 105d situated at the other side (ON side). In the step 4, the intermediate electric potential is applied to neighboring two electrodes 105a and 105b situated at one side (OFF side) and the electric potentials switched and different from the electric potentials in the second step are applied to the neighboring two electrodes 105c and 105d situated at the other side (ON side).

In the step 1, a high electric potential "a" is applied to the electrode 105a, a low electric potential "c" is applied to the electrode 105b, and an intermediate electric potential "b" is applied to the electrodes 105c and 105d. As a result of this, the plate shape member 104 having the conductive layer and facing electrodes 105, which electrically floats, becomes the same potential as the intermediate electric potential b, as is easily assumed from a simple calculation of a closed circuit. As a result of this, en electrical field is not generated to the electrodes 105c and 105d at the side of "ON". An electrical field is generated to the electrodes 105a and 105b at the side of "OFF" as shown in FIG. 5-(a). The generation of this electrical field is quite different from the conventional method for driving the light deflector (optical switch). Because of the electrical field, electrostatic attractions are generated between the electrode 105a and the plate shape member 104 and between the electrode 105b and the plate shape member 104, so that the plate shape member 104 is tilted and displaced to the side of OFF. This operation is a reset operation implemented at an early stage of a series of light deflections or OFF operations of the series of light deflections.

Next, in the step 2, a high electric potential "a" is applied to the electrode 105c, a low electric potential "c" is applied to the electrode 105d, and an intermediate electric potential "b" is applied to the electrodes 105a and 105b. As a result of this, the plate shape member 104 having the conductive layer and facing electrodes 105, which electrically floats, becomes the same potential as the intermediate electric potential b, as is easily assumed from a simple calculation of a closed circuit. As a result of this, en electrical field is not generated to the electrodes 105a and 105b at the side of "OFF". An electrical field is generated to the electrodes 105c and 105d at the side of "ON" as shown in FIG. 5-(b). Because of the electrical field, electrostatic attractions are generated between the electrode 105c and the plate shape member 104 and between the electrode 105d and the plate shape member 104, so that the plate shape member 104 is tilted and displaced to the side of ON. This operation is an ON operation of the series of light deflections.

Next, in the step 3, a high electric potential "a" is applied to the electrode 105b, a low electric potential "c" is applied to the electrode 105a, and an intermediate electric potential "b" is applied to the electrodes 105c and 105d. As a result of this, the plate shape member 104 having the conductive layer and facing electrodes 105, which electrically floats, becomes the same potential as the intermediate electric potential b. As a result of this, an electrical field is not generated to the electrodes 105c and 105d at the side of "ON". An electrical field is generated to the electrodes 105a and 105b at the side of "OFF" as shown in FIG. 5-(c). At this time, the direction of the electrical field becomes opposite to the direction shown in FIG. 5-(a) Because of the electrical field, electrostatic attractions are generated between the electrode 105a and the plate shape member 104 and between the electrode 105b and the plate shape member 104, so that the plate shape member 104 is tilted and displaced to the side of OFF. This operation is an OFF operation of the series of light deflections.

Next, in the step 4, a high electric potential "a" is applied to the electrode 105d, a low electric potential "c" is applied to the electrode 105c, and an intermediate electric potential "b" is applied to the electrodes 105a and 105b. As a result of this, the plate shape member 104 having the conductive layer and facing electrodes 105, which electrically floats, becomes the same potential as the intermediate electric potential b. As a result of this, an electrical field is not generated to the electrodes 105a and 105b at the side of "OFF". An electrical field is generated to the electrodes 105c and 105d at the side of "ON" as shown in FIG. 5-(d). At this time, the direction of the electrical field becomes opposite to the direction shown in FIG. 5-(b) Because of the electrical field, electrostatic attractions are generated between the electrode 105c and the plate shape member 104 and between the electrode 105d and the plate shape member 104, so that the plate shape member 104 is tilted and displaced to the side of ON. This operation is an ON operation of the series of light deflections.

By periodically combining application of the electric potentials in the step 1 through step 4, it is possible to set off the electrical charge, stored in the insulating film 106 by the electrical field, by reversing the electrical field, so that the storage of the electrical charge is reduced.

Second Embodiment

Figure 7:
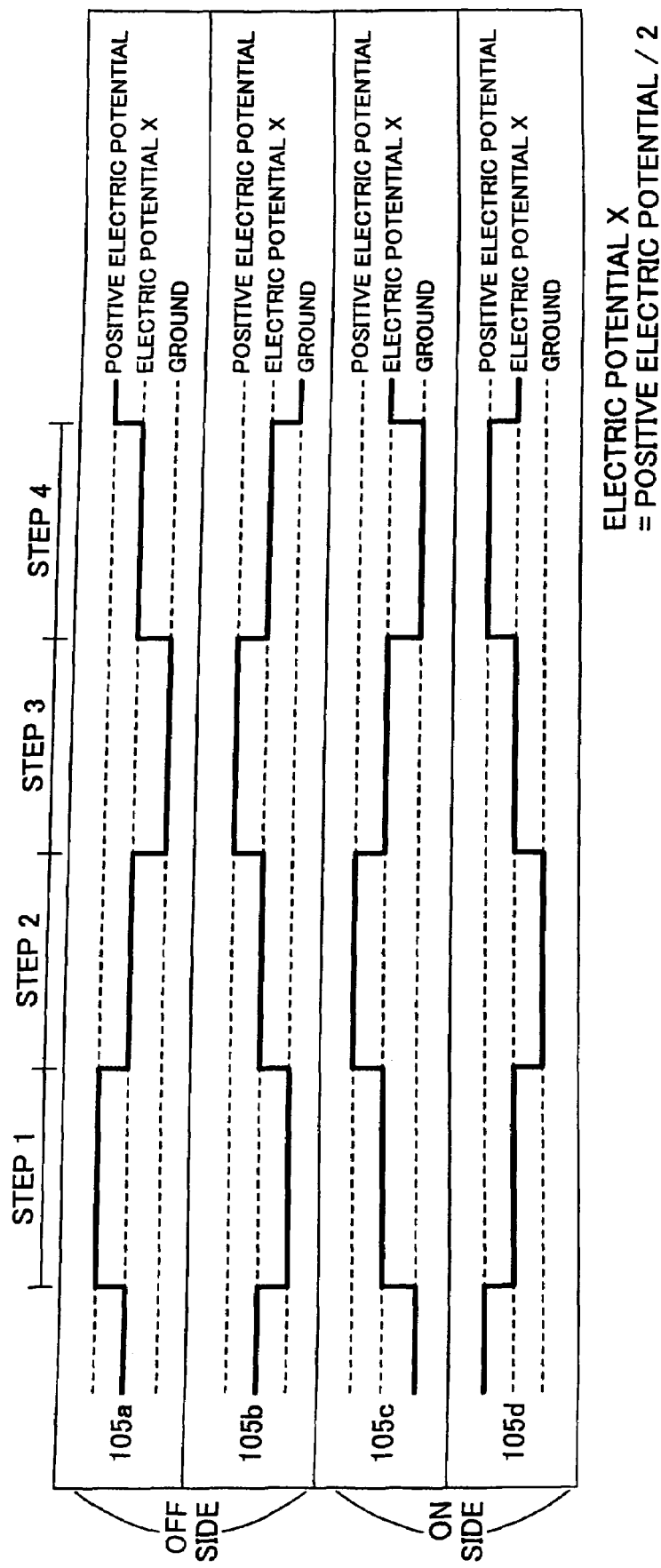
FIG. 7 is a timing chart of electric potentials applied to electrodes in the method for driving the light deflector of the second embodiment.

FIG. 7 is a timing chart of electric potentials applied to electrodes in the method for driving the light deflector of the second embodiment. In FIG. 7, an electric potential "x" is an electric potential having a half value of a positive electric potential. Referring to FIG. 7, the method for driving the light deflector of the second embodiment of the present invention and tilt displacement operations (light deflection operations) of the plate shape member 104 corresponding to the method are discussed. In the method for driving the light deflector of the second embodiment of the present invention, an electric potential of either of different electric potentials of the method for driving the light deflector of the first embodiment is a positive electric potential, another electric potential of different electric potential of the method for driving the light deflector of the first embodiment is ground potential, and an intermediate electric potential is a half of the positive electric potential.

In the step 1, a positive electric potential is applied to the electrode 105a, the electrode 105b is made ground, and an intermediate positive electric potential "x" is applied to the electrodes 105c and 105d. As a result of this, the plate shape member 104 becomes the same potential as the intermediate positive electric potential x. As a result of this, an electrical field is not generated to the electrodes 105c and 105d at the side of "ON". An electrical field is generated to the electrodes 105a and 105b at the side of "OFF" as shown in FIG. 5-(a). The generation of this electrical field is quite different from the conventional method for driving the light deflector (optical switch). Because of the electrical field, electrostatic attractions are generated between the electrode 105a and the plate shape member 104 and between the electrode 105b and the plate shape member 104, so that the plate shape member 104 is tilted and displaced to the side of OFF. This operation is a reset operation implemented at an early stage of a series of light deflections or OFF operations of the series of light deflections.

Next, in the step 2, a positive electric potential is applied to the electrode 105c, the electrode 105d is made ground, and a positive intermediate electric potential is applied to the electrodes 105a and 105b. As a result of this, the plate shape member 104 becomes the same potential as the intermediate positive electric potential x. As a result of this, an electrical field is not generated to the electrodes 105a and 105b at the side of "OFF". An electrical field is generated to the electrodes 105c and 105d at the side of "ON" as shown in FIG. 5-(b). Because of the electrical field, electrostatic attractions are generated between the electrode 105c and the plate shape member 104 and between the electrode 105d and the plate shape member 104, so that the plate shape member 104 is tilted and displaced to the side of ON. This operation is an ON operation of the series of light deflections.

Next, in the step 3, a positive electric potential is applied to the electrode 105b, the electrode 105a is made ground, and a positive intermediate electric potential "x" is applied to the electrodes 105c and 105d. As a result of this, the plate shape member 104 becomes the same potential as the intermediate positive electric potential x. As a result of this, en electrical field is not generated to the electrodes 105c and 105d at the side of "ON". An electrical field is generated to the electrodes 105a and 105b at the side of "OFF" as shown in FIG. 5-(c). At this time, the direction of the electrical field becomes opposite to the direction shown in FIG. 5-(a). Because of the electrical field, electrostatic attractions are generated between the electrode 105a and the plate shape member 104 and between the electrode 105b and the plate shape member 104, so that the plate shape member 104 is tilted and displaced to the side of OFF. This operation is an OFF operation of the series of light deflections.

Next, in the step 4, a positive electric potential is applied to the electrode 105d, the electrode 105c is made ground, and a positive intermediate electric potential "x" is applied to the electrodes 105a and 105b. As a result of this, the plate shape member 104 becomes the same potential as the intermediate positive electric potential x. As a result of this, an electrical field is not generated to the electrodes 105a and 105b at the side of "OFF". An electrical field is generated to the electrodes 105c and 105d at the side of "ON" as shown in FIG. 5-(d). At this time, the direction of the electrical field becomes opposite to the direction shown in FIG. 5-(b). Because of the electrical field, electrostatic attractions are generated between the electrode 105c and the plate shape member 104 and between the electrode 105d and the plate shape member 104, so that the plate shape member 104 is tilted and displaced to the side of ON. This operation is an ON operation of the series of light deflections.

By periodically combining application of the electric potentials in the step 1 through step 4, it is possible to set off the electrical charge, stored in the insulating film 106 by the electrical field, by reversing the electrical field, so that the storage of the electrical charge is reduced.

An advantage of the second embodiment is that the electric potentials applied to the electrodes 105a through 105d are positive electric potentials and made ground. That is, if the driving circuit is formed on the substrate the same as the light deflector so as to reduce the cost, since a unipolar driving circuit has a simple structure than a bipolar driving circuit, it is possible to reduce the manufacturing cost of the light deflector.

Third Embodiment

Figure 8:
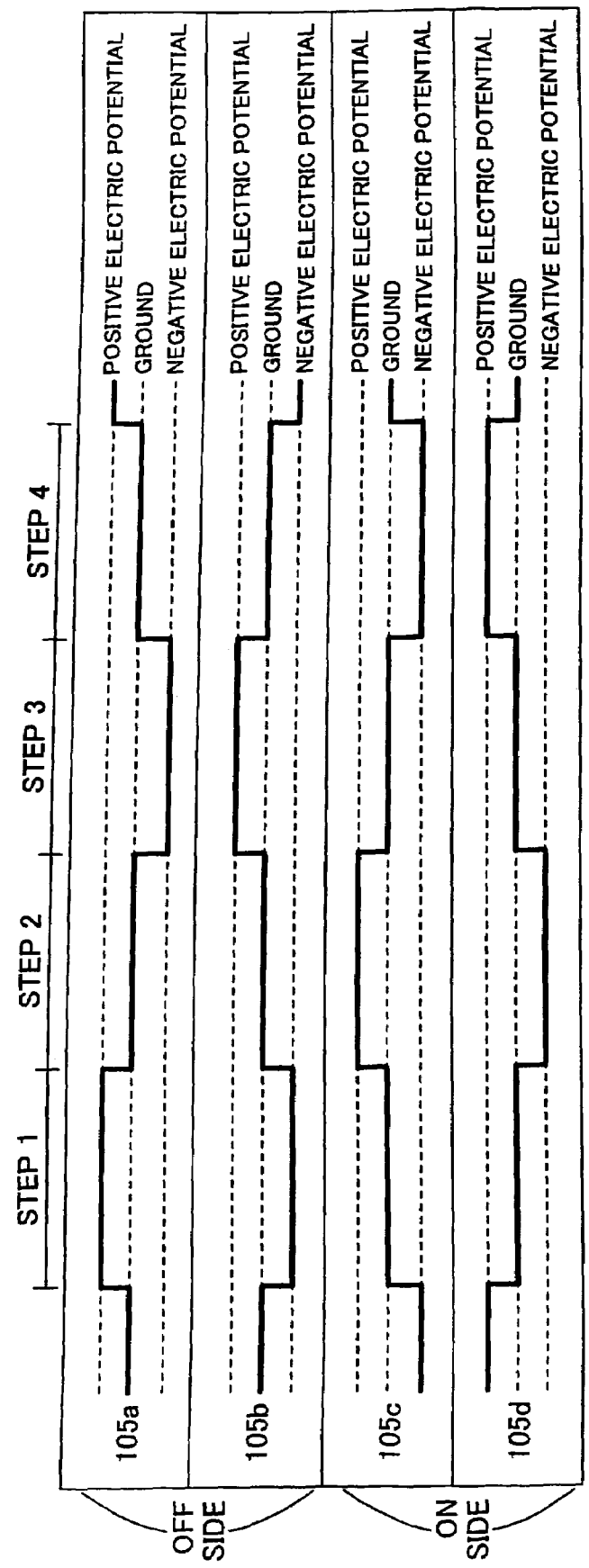
FIG. 8 is a timing chart of electric potentials applied to electrodes in the method for driving the light deflector of the third embodiment.

FIG. 8 is a timing chart of electric potentials applied to electrodes in the method for driving the light deflector of the third embodiment. In FIG. 8, although the polarity of a positive electric potential is different from the polarity of a negative electric potential, both of them have substantially the same value. Referring to FIG. 8, the method for driving the light deflector of the third embodiment of the present invention and tilt displacement operations (light deflection operations) of the plate shape member 104 corresponding to the method are discussed. In the method for driving the light deflector of the third embodiment of the present invention, an electric potential of either of different electric potentials of the method for driving the light deflector of the first embodiment is a positive electric potential, another electric potential of the different electric potentials of the method for driving the light deflector of the first embodiment is a negative electric potential, and an intermediate electric potential is made ground.

In the step 1, a positive electric potential is applied to the electrode 105a, a negative electric potential is applied to the electrode 105b, and the electrodes 105c and 105d are made ground. As a result of this, the plate shape member 104 becomes the same electric potential as ground. As a result of this, an electrical field is not generated to the electrodes 105c and 105d at the side of "ON". An electrical field is generated to the electrodes 105a and 105b at the side of "OFF" as shown in FIG. 5-(a). The generation of this electrical field is quite different from the conventional method for driving the light deflector (optical switch). Because of the electrical field, electrostatic attractions are generated between the electrode 105a and the plate shape member 104 and between the electrode 105b and the plate shape member 104, so that the plate shape member 104 is tilted and displaced to the side of OFF. This operation is a reset operation implemented at an early stage of a series of light deflections or OFF operations of the series of light deflections.

Next, in the step 2, a positive electric potential is applied to the electrode 105c, a negative electric potential is applied to the electrode 105d, and the electrodes 105a and 105b are made ground. As a result of this, the plate shape member 104 becomes then same electric potential as ground. As a result of this, an electrical field is not generated to the electrodes 105a and 105b at the side of "OFF". An electrical field is generated to the electrodes 105c and 105d at the side of "ON" as shown in FIG. 5-(b). Because of the electrical field, electrostatic attractions are generated between the electrode 105c and the plate shape member 104 and between the electrode 105d and the plate shape member 104, so that the plate shape member 104 is tilted and displaced to the side of ON. This operation is an ON operation of the series of light deflections.

Next, in the step 3, a positive electric potential is applied to the electrode 105b, a negative electric potential is applied to the electrode 105a, and the electrodes 105c and 105d are made ground. As a result of this, the plate shape member 104 becomes the same electric potential as ground. As a result of this, an electrical field is not generated to the electrodes 105c and 105d at the side of "ON". An electrical field is generated to the electrodes 105a and 105b at the side of "OFF" as shown in FIG. 5-(c). At this time, the direction of the electrical field becomes opposite to the direction shown in FIG. 5-(a). Because of the electrical field, electrostatic attractions are generated between the electrode 105a and the plate shape member 104 and between the electrode 105b and the plate shape member 104, so that the plate shape member 104 is tilted and displaced to the side of OFF. This operation is an OFF operation of the series of light deflections.

Next, in the step 4, a positive electric potential is applied to the electrode 105d, a negative electric potential is applied to the electrode 105ch, and the electrodes 105a and 105b are made ground. As a result of this, the plate shape member 104 becomes the same electric potential as ground. As a result of this, an electrical field is not generated to the electrodes 105a and 105b at the side of "OFF". An electrical field is generated to the electrodes 105c and 105d at the side of "ON" as shown in FIG. 5-(d). At this time, the direction of the electrical field becomes opposite to the direction shown in FIG. 5-(b). Because of the electrical field, electrostatic attractions are generated between the electrode 105c and the plate shape member 104 and between the electrode 105d and the plate shape member 104, so that the plate shape member 104 is tilted and displaced to the side of ON. This operation is an ON operation of the series of light deflections.

By periodically combining application of the electric potentials in the step 1 through step 4, it is possible to set off the electrical charge, stored in the insulating film 106 by the electrical field, by reversing the electrical field, so that the storage of the electrical charge is reduced.

An advantage of the third embodiment is that although the polarity of a positive electric potential is different from the polarity of a negative electric potential, both of them have substantially the same value, and the intermediate electric potential is made ground. Therefore, the electric potential of the plate shape member 104 electrically floating is made the same electric potential as ground, in the step 1 through step 4. Therefore, it is difficult to generate the electrical field between the plate shape member 104 and the control member as a stopper. Hence, when the plate shape member 104 collides with the stopper, the insulating film forming the control member is prevented from being electrically charged. That is, since it is possible to control the storing of the electric charge at the control member, an optional tilt and displacement corresponding to the electric potential of the electrode of the plate shape member is made stable. Accordingly, a light deflection operation of the light deflector is made further stable.

Fourth Embodiment

Figure 9:
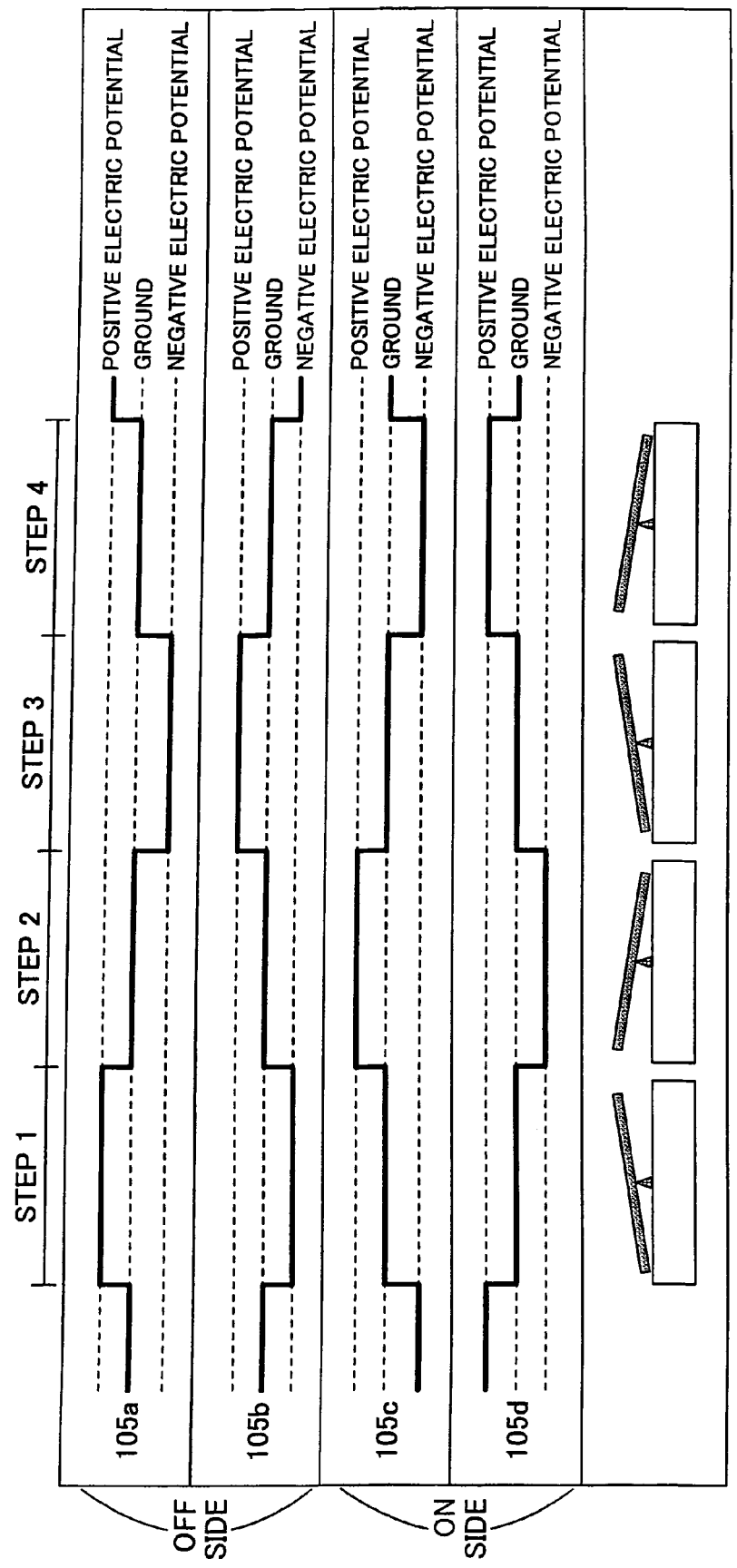
FIG. 9 is a timing chart of electric potentials applied to electrodes of the third embodiment and a light deflection operation by a method for driving of the fourth embodiment.

A method for driving a light deflector of the fourth embodiment is described by using the third embodiment. FIG. 9 is a timing chart of electric potentials applied to electrodes of the third embodiment and a light deflection operation by a method for driving of the fourth embodiment. In the method for driving of the fourth embodiment, each of step 1 through step 4 corresponds to a light deflection operation.

That is, in the fourth embodiment, one time operation of each of the step 1 and step 3 corresponds to the OFF operation of the light deflection. One time operation of each of the step 2 and step 4 corresponds to the ON operation of the light deflection. Actual operation time of the light deflector groups, which are two-dimensionally arranged corresponding to pixels in a case where the above-discussed operation is applied to a projection type image display apparatus, is as follows. For example, if the frame rate is 60 Hz, the display time of one picture which is projected is 16.67 milliseconds. Assuming that three-color displaying is done in advance in the above-mentioned display time, a maximum operation time for keeping an operation (keeping ON or OFF) of the light deflector per one color is 5.56 milliseconds. The ON operation time and OFF operation time are different as corresponding to color gradation. In the method for driving of the fourth embodiment, operation times correspond to step 1 through step 4, respectively. Since the step is switched in the above mentioned operation time, it is possible to relatively reduce the driving frequency of a driving circuit to which the electric potential is applied. Therefore, it is possible to use a cheap driving circuit and therefore it is possible to provided a cheap light deflector.

Fifth Embodiment

Figure 10:
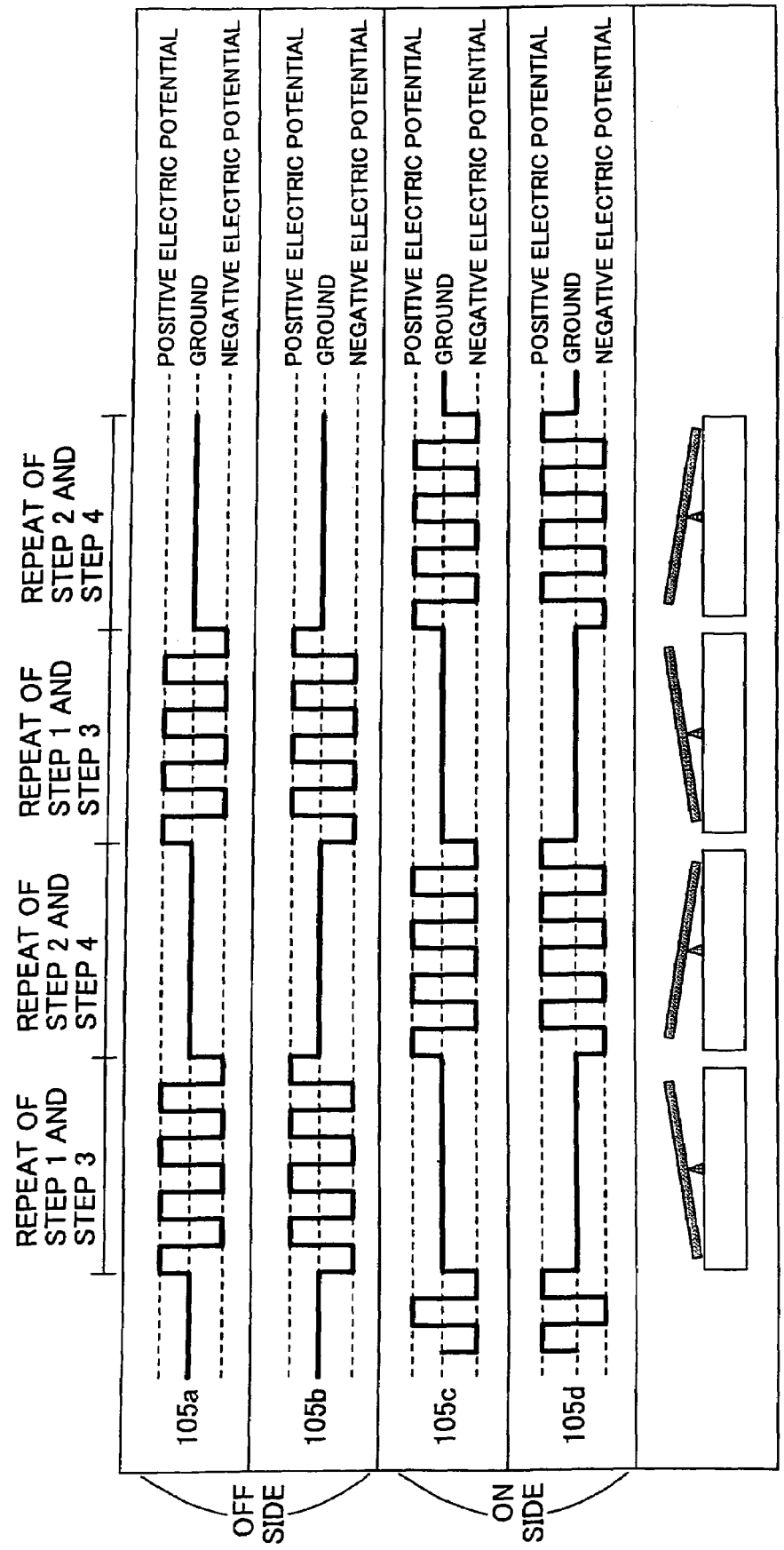
FIG. 10 is a timing chart of electric potentials applied to electrodes of the third embodiment and a light deflection operation by a method for driving of the fifth embodiment.

A method for driving a light deflector of the fourth embodiment is described by using the third embodiment. FIG. 10 is a timing chart of electric potentials applied to electrodes of the third embodiment and a light deflection operation by a method for driving of the fifth embodiment.

In the method for driving of the fifth embodiment, the step 1 and step 3 are repeated in a same light deflection operation and step 2 and step 4 are repeated in another same light deflection operation.

That is, in the fifth embodiment, repeated operation of the step 1 and step 3 corresponds to one time OFF operation of the light deflection. Repeated operation of the step 2 and step 4 corresponds to one time ON operation of the light deflection. Actual operation time of the light deflector groups, which are two-dimensionally arranged corresponding to pixels in a case where the above-discussed operation is applied to a projection-type image display apparatus, is as follows. For example, if the frame rate is 60 Hz, a display time of one picture which is projected is 16.67 milliseconds. Assuming that three-color displaying is done in advance in the above-mentioned display time, the maximum operation time for keeping an operation (keeping ON or OFF) of the light deflector per one color is 5.56 milliseconds. The ON operation time and OFF operation time are different as corresponding to color gradation. In the method for driving of the fifth embodiment, the step 1 and step 3 or the step 2 and step 4 are respectively repeated and operated during the operation time. That is, for example, in a case where the step 2 and step 4 are switched and done at a period of 21.7 microseconds, if the maximum display time is 5.56 milliseconds, switch operations are done 256 times.

The advantage of the method for driving of the fifth embodiment is that if the applied electric potential is a high electric potential, the amount of electrical charge stored in unit time is large but the switching time is quick. Hence, an electric charge stored in one time light deflection operation is removed any time, so that the operation of the light deflector is stable. That is, the light deflector can be operated stably at a high driving voltage.

Sixth Embodiment

Figure 11:
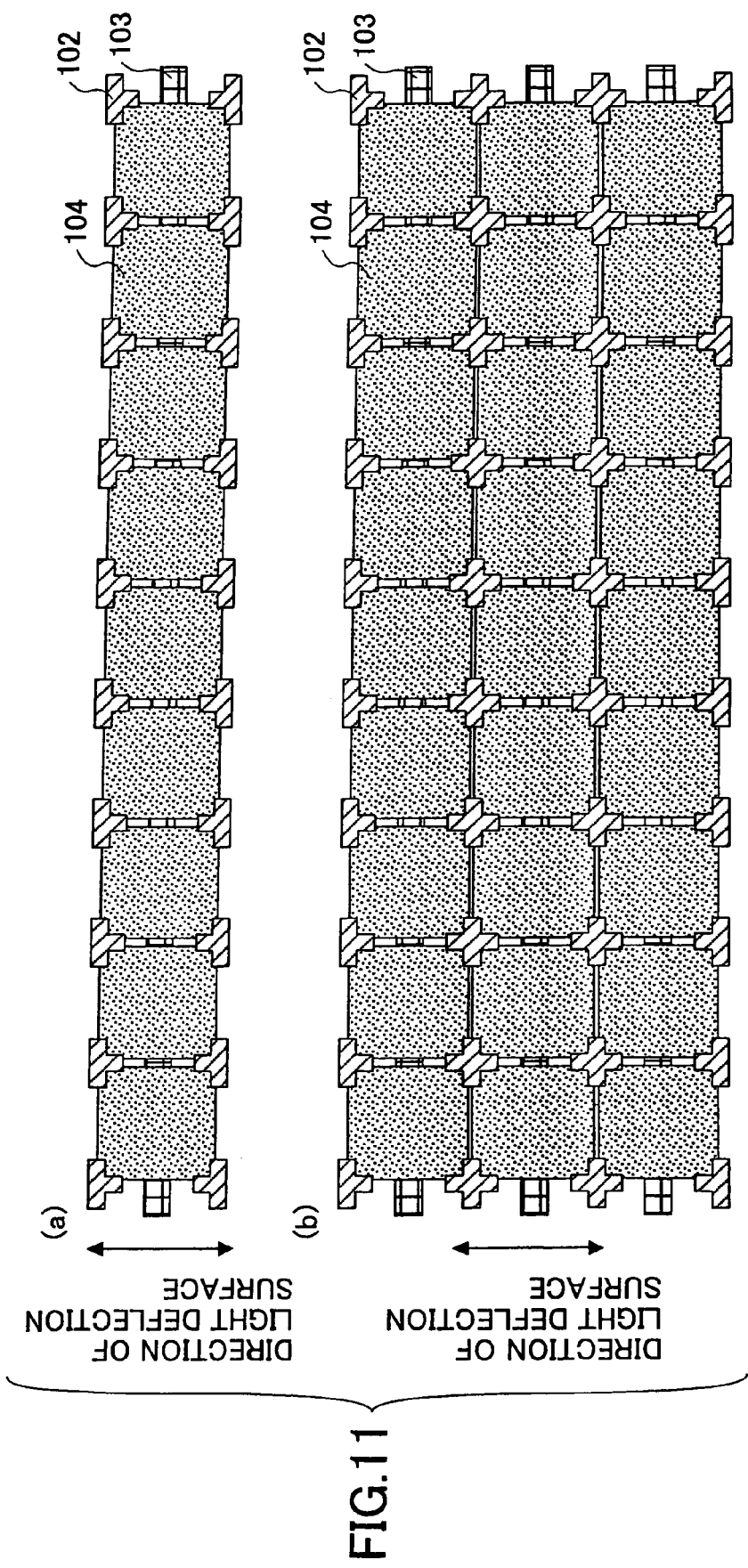
FIG. 11 is a view showing a light deflection array of the sixth embodiment of the present invention.

FIG. 11 is a view showing a light deflection array of the sixth embodiment of the present invention. FIG. 11-(a) showing a one-dimensional array is a plan view of the light deflection array where a plurality of the light reflectors are arranged in a direction perpendicular to the direction of a light deflection surface so as to make one line. FIG. 11-(b) showing a two-dimensional array is a plan view of the light deflection array where a plurality of the light reflectors are arranged in a direction perpendicular to the direction of a light deflection surface so as to make multiple lines. By arranging the light deflectors of the present invention one-dimensionally or two-dimensionally so as to make a light deflection array, it is possible to control an electric charge so that it is possible to provide a light reflector array whereby little operation error occurs.

Seventh Embodiment

Figure 12:
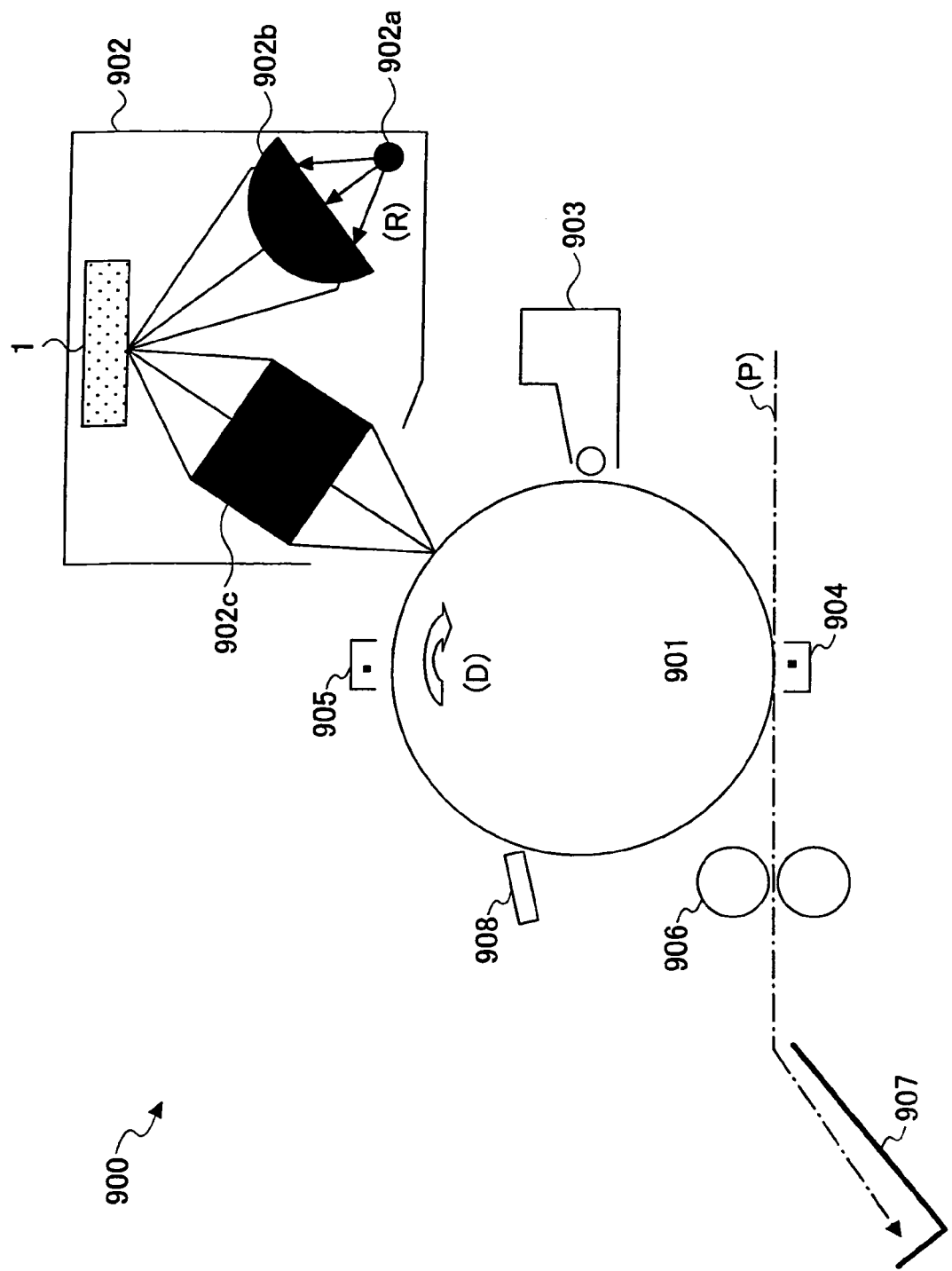
FIG. 12 is a schematic diagram showing an image forming device of the seventh embodiment of the present invention.

FIG. 12 is a view showing an image forming device of the seventh embodiment of the present invention. In the image forming device shown in FIG. 12, the light deflection array 1 of the sixth embodiment is used as a light writing unit 902 functions as a latent image forming means.

An image forming device 900 forms an image by light-writing based on an electronic picture process. The image forming device 900 includes a drum-shaped photosensitive body of an image carrier 901. The image carrier is rotatably held in a direction indicated by an arrow D and carries formed images. The photosensitive body of the image carrier is electrically charged evenly by electric charge means 905. Light-writing is done on the photosensitive body by the light writing unit 902 formed by the light deflection array 1 so that a latent image is formed. The latent image is formed on the photosensitive body as a toner image by developing means 903. And then, the toner image is transferred to a transferred body (P) by transferring means 904. After the toner image transferred to the transferred body (P) is fixed by fixing means 906, the transferred body (P) is discharged to a discharging tray 907 so as to be stored. On the other hand, the photosensitive body of the image carrier 901 after the toner image is transferred to the transferred body (P) by the transferring means 904 is cleaned by cleaning means 908 so as to be prepared for the next image forming process.

The light writing unit 902 irradiates a beam (R) from a light source 902a incident onto the light deflection array 1 via a first lens system 902b. Each of the light deflectors is tilted and displaced corresponding to image information so as to change the direction of reflection light and light deflection array 1 image-forms the irradiated beam (R) on a surface of the photosensitive body of the image carrier 901 via a second lens system 902c.

It is possible to stably operate respective light deflectors, which form the light deflection array 1, at the time of repeating operation by using the light deflection array 1 as a light writing unit of the image forming device. Therefore, light writing corresponding to an image signal is implemented to form respective printing dots so that a desirable image can be formed precisely.

Eighth Embodiment

Figure 13:
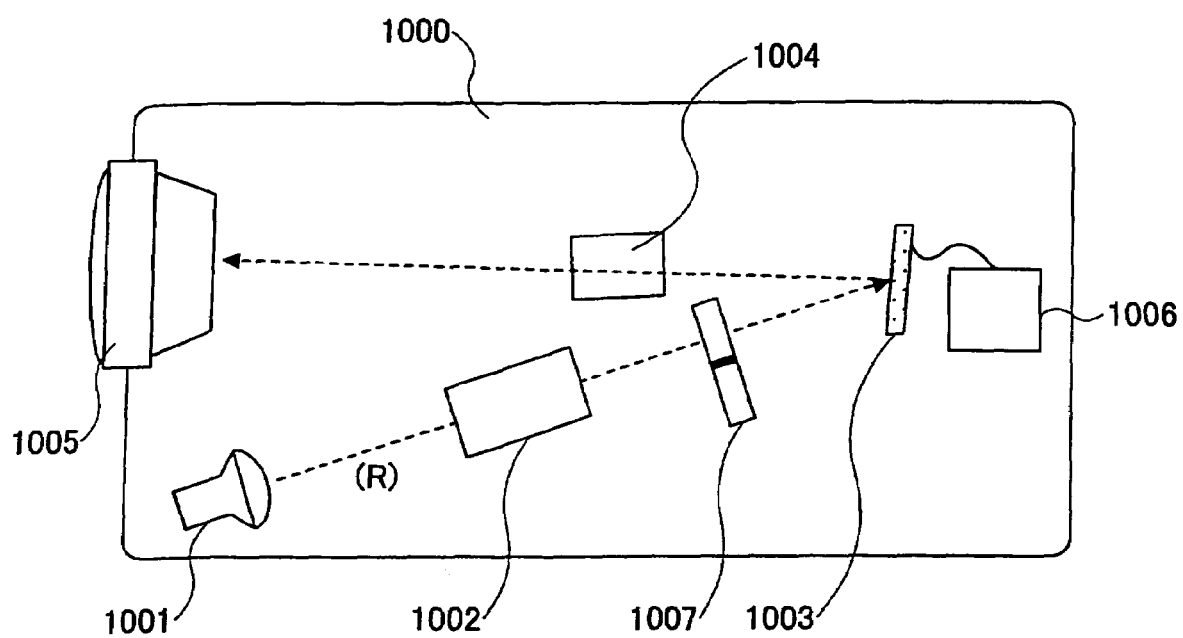
FIG. 13 is a schematic diagram showing an image projection display apparatus of the eighth embodiment of the present invention.

FIG. 13 is a view showing an image projection display apparatus of the eighth embodiment of the present invention. An image projection display apparatus 1000 of the eighth embodiment uses the light deflection array of the sixth embodiment as a display unit 1003 by which a beam (R) from a light source 1001 is reflected in the direction of an object, corresponding to image information.

Referring to FIG. 13, the light source 1001 is light source means cheaper than a laser light source, for example, a white color light source. A lighting optical system 1002 leads the beam from the light source 1001 to a light deflection array 1003 of the present invention. Projection optical systems 1004 and 1005 expand and project a beam deflected in the direction of an object by the light deflection array arranged two-dimensionally corresponding to a pixel line in the vertical direction of a display picture and a pixel line in the horizontal direction of the display picture. A control system 1006 formed by electronic circuits controls operation of the light deflection array 1003. In FIG. 13, a part of the light beam (R) is indicated by a dotted line. Light emitted from the light source 1001 is led to the light deflection array 1003 by lighting optical system 1002. The light beam deflected by the light deflection array 1003 is projected as a two-dimensional image by the projection optical systems 1004 and 1005. A rotating color wheel 1007 is used for selecting the wave length of the incident beam which is led to the light deflection array 1003.

In the image projection display apparatus of the eighth embodiment, the light deflection apparatus group which is driven by a method for driving wherein storage of electric charges is controlled, namely the light deflection array, is used as a display unit. Hence, it is possible to stably operate respective light deflectors, which form the light deflection array, at the time of repeating operations. Therefore, a displaying operation of light information corresponding to an image signal is implemented for respective printing pixels so that a desirable image can be formed precisely.

The present invention is not limited to these embodiments, but variations and modifications may be made without departing from the scope of the present invention.

This patent application is based on Japanese Priority Patent Application No. 2003-183969 filed on Jun. 27, 2003, the entire contents of which are hereby incorporated by reference.

What is claimed is:

1. A method for driving a light deflector,
    wherein the light deflector deflects a beam incident on a light reflection area by displacing a plate shape member having the light reflection area with an electrostatic force,
    wherein the light deflector includes a substrate, a plurality of stoppers, a fulcrum member, and the plate shape member,
    wherein the fulcrum member includes a vertex part and is provided at an upper surface of the substrate, and
    wherein the plate shape member does not have a fixed end, the plate shape member is movably arranged in a space formed by the substrate, the fulcrum member, and the stoppers,
    the method comprising:
    turning over a direction of an electric field acting on the plate shape member, in an optional period.

2. The method for driving the light deflector as claimed in claim 1,
    wherein the stoppers are provided at upper parts of control members, and the control members are provided at a plurality of end parts of the substrate,
    wherein the light reflection area is provided at an upper surface of the plate shape member,
    wherein the plate shape member includes a conductive layer made of a partially conductive member, and wherein the light deflector includes an at least three electrodes provided on the substrate and substantially facing the conductive layer of the plate shape member.

3. The method for driving the light deflector as claimed in claim 2,
wherein neighboring two of the electrodes are provided at one side (ON side) and another neighboring two of the electrodes are provided at another side (OFF side) under the state in which the fulcrum member is a center,
wherein the method further comprises the steps of:
a) applying different electric potentials to the electrodes provided at the OFF side and applying an intermediate electric potentials of the different electric potentials to the electrodes provided at the ON side;
b) applying the intermediate electric potential to the electrodes provided at the OFF side and applying the different electric potentials to the electrodes provided at the ON side;
c) applying switched different electric potentials to the electrodes provided at the OFF side and applying the intermediate electric potential of the different electric potentials to the electrodes provided at the ON side; and
d) applying the intermediate electric potential to the electrodes provided at the OFF side and applying the switched different electric potentials to the electrodes provided at the ON side.

4. The method for driving the light deflector as claimed in claim 3,
wherein one of the different electric potentials is a positive electric potential,
wherein the other of the different electric potentials is made ground, and
wherein the intermediate electric potential has a value of a half of the positive electric potential.

5. The method for driving the light deflector as claimed in claim 3,
wherein one of the different electric potentials is a positive electric potential,
wherein the other of the different electric potentials is a negative electric potential, and
wherein the intermediate electric potential is made ground.

6. The method for driving the light deflector as claimed in claim 3,
wherein each of the steps a) through d) corresponds to a light deflection operation.

7. The method for driving the light deflector as claimed in claim 3,
wherein the step a) and step c) are repeated in a same light deflection operation, and
the step b) and step d) are repeated in another same light deflection operation.

8. A light deflector which deflects a beam incident on a light reflection area by displacing a plate shape member having the light reflection area with an electrostatic force, comprising:
a substrate;
a plurality of stoppers;
a fulcrum member; and
the plate shape member;
wherein the fulcrum member includes a vertex part and is provided at an upper surface of the substrate, and
wherein the plate shape member does not have a fixed end, the plate shape member is movably arranged in a space formed by the substrate, the fulcrum member, and the stoppers, and
wherein a direction of an electric field acting on the plate shape member is turned over in an optional period so that a light deflection operation is implemented.

9. The light deflector according to claim 8,
wherein the stoppers are provided at upper parts of control members, and the control members are provided at a plurality of end parts of the substrate,
wherein the light reflection area is provided at an upper surface of the plate shape member,
wherein the plate shape member includes a conductive layer made of a partially conductive member, and
wherein the light deflector includes an electrode provided on the substrate and substantially facing the conductive layer of the plate shape member.

10. A light deflection array, comprising:
a plurality of light deflectors which are provided one-dimensionally or two-dimensionally and which deflect a beam incident on a light reflection area by displacing a plate shape member having the light reflection area with an electrostatic force,
wherein each of the light deflectors includes a substrate, a plurality of stoppers, a fulcrum member, and the plate shape member,
wherein the fulcrum member includes a vertex part and is provided at an upper surface of the substrate,
wherein the plate shape member does not have a fixed end, the plate shape member is movably arranged in a space formed by the substrate, the fulcrum member, and the stoppers, and
wherein a direction of an electric field acting on the plate shape member is turned over in an optional period so that a light deflection operation is implemented.

11. The light deflection array according to claim 10,
wherein the stoppers are provided at upper parts of control members, and the control members are provided at a plurality of end parts of the substrate,
wherein the light reflection area is provided at an upper surface of the plate shape member,
wherein the plate shape member includes a conductive layer made of a partially conductive member, and
wherein the light deflector includes an electrode provided on the substrate and substantially facing the conductive layer of the plate shape member.

12. An image forming device, comprising:
a light deflection array used as a light writing unit;
wherein the light deflection array includes a plurality of light deflectors which are provided one-dimensionally or two-dimensionally and which deflect a beam incident on a light reflection area by displacing a plate shape member having the light reflection area with an electrostatic force,
wherein each of the light deflectors includes a substrate, a plurality of stoppers, a fulcrum member, and the plate shape member,
wherein the fulcrum member includes a vertex part and is provided at an upper surface of the substrate,
wherein the plate shape member does not have a fixed end, the plate shape member is movably arranged in a space formed by the substrate, the fulcrum member, and the stoppers, and
wherein a direction of an electric field acting on the plate shape member is turned over in an optional period so that a light deflection operation is implemented.

13. The image forming device according to claim 12,
wherein the stoppers are provided at upper parts of control members, and the control members are provided at a plurality of end parts of the substrate, wherein the light reflection area is provided at an upper surface of the plate shape member, wherein the plate shape member includes a conductive layer made of a partially conductive member, and wherein the light deflector includes an electrode provided on the substrate and substantially facing the conductive layer of the plate shape member.

14. An image projection display device, comprising:

a light deflection array used as a display unit;

wherein the light deflection array, includes a plurality of light deflectors which are provided one-dimensionally or two-dimensionally and which deflect beam incident on a light reflection area by displacing a plate shape member having the light reflection area with an electrostatic force, wherein each of the light deflectors includes a substrate, a plurality of control members, a fulcrum member, and the plate shape member, wherein the fulcrum member includes a vertex part and is provided at an upper surface of the substrate, wherein the plate shape member does not have a fixed end, the plate shape member is movably arranged in a space formed by the substrate, the fulcrum member, and the stoppers, and wherein a direction of an electric field acting on the plate shape member is turned over in an optional period so that a light deflection operation is implemented.

15. The image projection display device according to claim 14, wherein the stoppers are provided at upper parts of control members, and the control members are provided at a plurality of end parts of the substrate, wherein the light reflection area is provided at an upper surface of the plate shape member, wherein the plate shape member includes a conductive layer made of a partially conductive member, and wherein the light deflector includes an electrode provided on the substrate and substantially facing the conductive layer of the plate shape member.

* * * * *

UNITED STATES PATENT AND TRADEMARK OFFICE
CERTIFICATE OF CORRECTION

PATENT NO. : 7,391,551 B2  
APPLICATION NO. : 11/393761  
DATED : June 24, 2008  
INVENTOR(S) : Nanjyo et al.

It is certified that error appears in the above-identified patent and that said Letters Patent is hereby corrected as shown below:

On the title page, the Terminal Disclaimer information has been omitted. Item (45) and the Notice information should read as follows:

Title Pg, insert the following:

--(45) Date of Patent:  *Jun. 24, 2008

(*) Notice: Subject to any disclaimer, the term of this patent is extended or adjusted under 35 U.S.C. 154(b) by 199 days.

This Patent is subject to a terminal disclaimer.--

Signed and Sealed this

Nineteenth Day of August, 2008

JON W. DUDAS  
*Director of the United States Patent and Trademark Office*